(12) United States Patent
Xu et al.

(10) Patent No.: US 11,010,645 B2
(45) Date of Patent: May 18, 2021

(54) INTERACTIVE ARTIFICIAL INTELLIGENCE ANALYTICAL SYSTEM

(71) Applicant: TalkMeUp, Pittsburgh, PA (US)

(72) Inventors: JiaoJiao Xu, Pittsburgh, PA (US); Yi Xu, Pittsburgh, PA (US); Chenchen Zhu, Pittsburgh, PA (US); Matthew Thomas Spettel, Merrimack, NH (US)

(73) Assignee: TalkMeUp, Pittsburgh, PA (US)

( * ) Notice: Subject to any disclaimer, the term of this patent is extended or adjusted under 35 U.S.C. 154(b) by 0 days.

(21) Appl. No.: 16/551,363

(22) Filed: Aug. 26, 2019

(65) Prior Publication Data
US 2020/0065612 A1    Feb. 27, 2020

Related U.S. Application Data

(60) Provisional application No. 62/723,369, filed on Aug. 27, 2018.

(51) Int. Cl.
| | |
|---|---|
| *G06K 9/62* | (2006.01) |
| *G06K 9/00* | (2006.01) |
| *G10L 25/51* | (2013.01) |
| *G09B 19/00* | (2006.01) |
| *G06N 3/02* | (2006.01) |
| *G10L 15/26* | (2006.01) |

(52) U.S. Cl.
CPC ......... *G06K 9/629* (2013.01); *G06K 9/00302* (2013.01); *G06K 9/00744* (2013.01); *G06N 3/02* (2013.01); *G09B 19/00* (2013.01); *G10L 15/26* (2013.01); *G10L 25/51* (2013.01)

(58) Field of Classification Search
None
See application file for complete search history.

(56) References Cited

U.S. PATENT DOCUMENTS

| | | | | |
|---|---|---|---|---|
| 5,583,961 A | * | 12/1996 | Pawlewski | G10L 25/87 704/241 |
| 2014/0095401 A1 | * | 4/2014 | Merrill | G06Q 10/1053 705/321 |
| 2017/0213190 A1 | * | 7/2017 | Hazan | G06Q 10/1053 |
| 2018/0150739 A1 | * | 5/2018 | Wu | G06F 17/271 |
| 2019/0043069 A1 | * | 2/2019 | Lee | A61B 5/7267 |

OTHER PUBLICATIONS

Hoque, M.E. et al., "Mach: My automated conversation coacH," Proc. of the 2013 ACM Intl. Joint Conf, on Pervasive and Ubiquitous Computing (2013) 10 pp. (Year: 2013).*

(Continued)

*Primary Examiner* — Brian M Smith
(74) *Attorney, Agent, or Firm* — Rowan TELS LLC

(57) ABSTRACT

A method and system for an AI-based communication training system for individuals and organizations is disclosed. A video analyzer is used to convert a video signal into a plurality of human morphology features with an accompanying audio analyzer converting an audio signal into a plurality of human speech features. A transformation module transforms the morphology features and the speech features into a current multi-dimensional performance vector and combinatorial logic generates an integration of the current multi-dimensional performance vector and one or more prior multi-dimensional performance vectors to generate a multi-session rubric. Backpropagation logic applies a current multi-dimensional performance vector from the combinatorial logic to the video analyzer and the audio analyzer.

18 Claims, 12 Drawing Sheets

(56) References Cited

OTHER PUBLICATIONS

Nain, I. et al., "Automated analysis and prediction of job interview performance," IEEE Trans. on Affective Computing, vol. 9, No. 2 (2018) pp. 191-204. (Year: 2018).*

Subramanaim, A. et al., "Bi-modal first impressions recognition using temporally ordered deep audio and stochastic video features," downloaded from <arxiv.org/abs/1610.10048> (Oct. 2016) 13 pp. (Year: 2016).*

Zhang, X.J. et al., "Finding lips in unconstrained imagery for improved automatic speech recognition," Intl. Conf. on Advances in Visual Information Systems (2007) pp. 185-192. (Year: 2007).*

Anderson, K. et al., "The TARDIS framework: intelligent virtual agents for social coaching in job interviews," 10th Intl. Conf. on Advances in Computer Entertainment, ACE 2013 (Nov. 2013) 17 pp. (Year: 2013).*

Ji, S. et al., "3d convolutional neural networks for human action recognition," Proc, of the 27th Intl. Conf. on Machine Learning (2010) 8 pp. (Year: 2010).*

Gucluturk, Y. et al., "Multimodal first impression analysis with deep residual networks," IEEE Trans. on Affective Computing, vol. 9, No. 3 (Jul.-Sep. 2018, available online at ieeexplore.ieee.org as of Sep. 12, 2017) pp. 316-329. (Year: 2017).*

PCT/US2019/048177 International Search Report dated Jan. 30, 2020.

PCT/US2019/048177 Written Opinion of the ISA dated Jan. 30, 2020.

* cited by examiner

INTERACTIVE ARTIFICIAL INTELLIGENCE ANALYTICAL SYSTEM

CROSS-REFERENCE TO RELATED APPLICATIONS

This application claims priority and benefit under 35 USC 119(e) to US provisional application No. 62/723,369, titled "AI-Based Communication System", filed on Aug. 27, 2018, the contents of which are incorporated herein by reference in their entirety.

BACKGROUND

Communications training or communication skills training refers to various types of training to develop necessary skills for communication. Individuals may undergo communications training to develop and improve communication skills related to various roles in organizations. An effective communications trainer may assist organizational members in improving communications between sub-groups of the organization. Communications training can assist leaders to develop the ability to perceive how various individuals and subgroups relate to each other and make appropriate interventions.

Types of skill development related to communications training include: listening skills, influence skills, responding to conflict, customer service, assertiveness skills, negotiation, facilitation, report writing (e.g., business and technical writing), public speaking and presentation, speaking skills, and interaction skills.

Due to the benefits of communication training in its various forms, there exists a clear need for individuals and organizations to improve their communication delivery assisted by technology to analyze visual and/or auditory data of the actual communicator (and groups thereof) and provide feedback to the communicator, the organization, and for the purpose of refining learning models to improve results over time.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
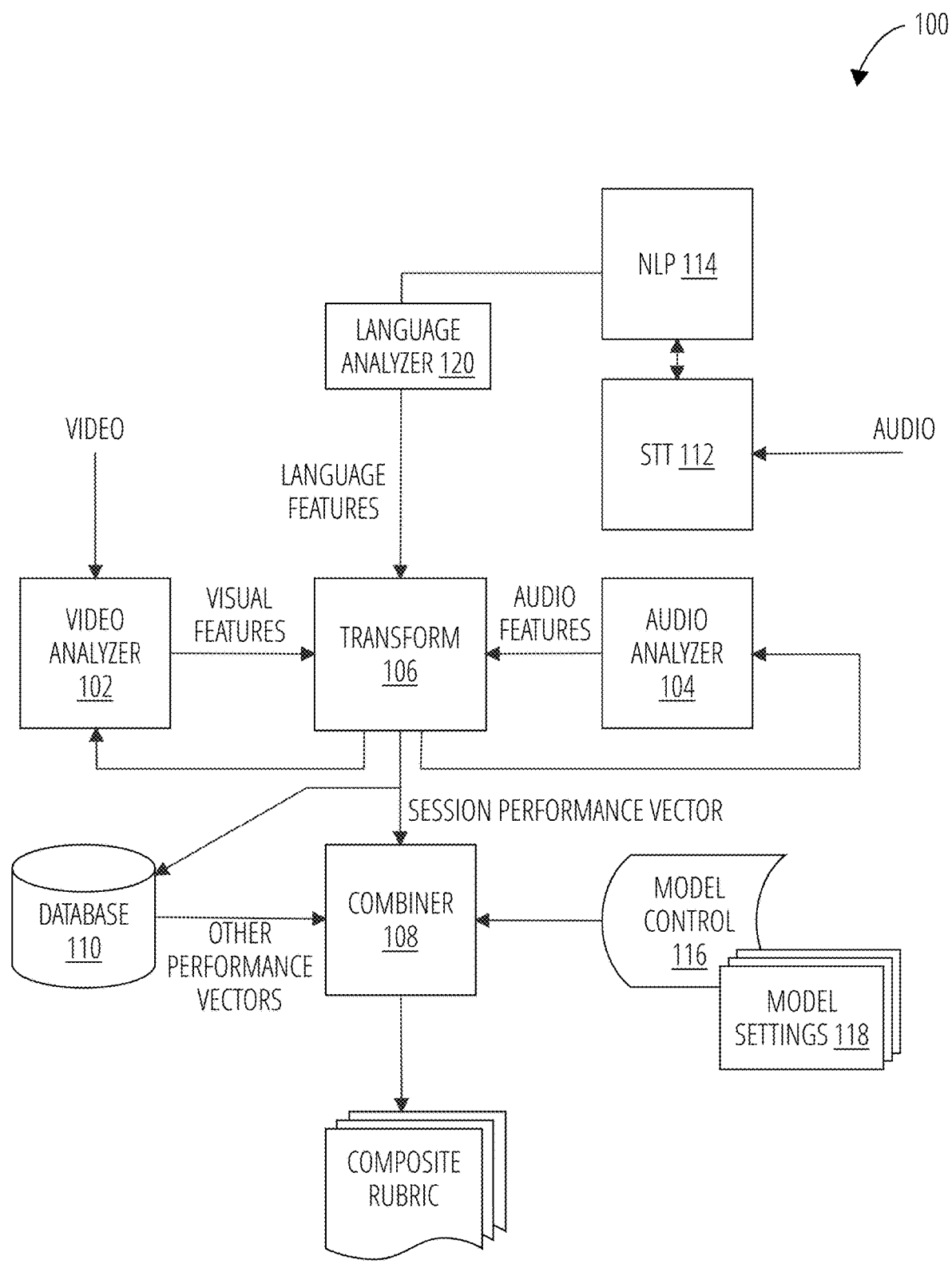
FIG. 1 depicts an interactive analytical system 100 in accordance with one embodiment.

Embodiments of a system and techniques are herein disclosed providing interactive feedback to a trainee based on a computational analysis of a video/audio stream or recording of said trainee. The system provides analysis and personalized feedback based upon video and audio information gathered from a trainee. Video and audio capture may be accomplished through conventional mechanisms, e.g. cameras, microphones, etc. The feedback may take the form of recommendations for behavioral changes related to communication by the trainee. The recommendation is derived from the application of various practice settings including rubrics and content for integration.

The system comprises modules that process the video and audio information described above to create recommendations or scores, which can be evaluated in aggregate form or by individual communication attributes (e.g., enthusiasm, confidence, engagement, etc.). "Module" refers to logic organized in such a way as to comprise defined entry and exit points at its interface, for activation of functionality of the module by logic external to the module. The analyzers—both a video analyzer and audio analyzer—work individually and in combination where required (e.g., providing inputs to an emotion detector). The video analyzer converts a video signal of the trainee's session into morphology feature predictions such as facial expression, eye contact, gesture and other visual attributes.

"Emotion detector" refers to a class of algorithms for detecting human emotion from speech audio and/or text. The technical discipline for developing emotion detectors is often referred to as Speech Emotion Recognition or SER for short. Speech emotion detectors may provide predictions or classifications of emotion states by identifying correlations between emotions and audio features such as pitch, loudness and energy. A number of well-known statistical pattern recognition techniques may also be utilized by emotion detectors. Commonly available open-source feature extraction libraries such as openSMILE may also be utilized along with online toolsets such as support vector machine by emotion detectors. "Audio analyzer" refers to Logic that receives digital audio signals and performs signal processing to extract audio features from the audio signals. Examples of audio features are tonal variance, enunciation metrics, articulation metrics, and pacing metrics. "Pacing metric" refers to a value indicative of the speed at which speech is delivered. "Video analyzer" refers to logic that receives digital video signals and performs signal processing to extract spatial, color, motion, object, and other features from the video signals. "Logic" refers to any set of one or more components configured to implement functionality in a machine. Logic includes machine memories configured with instructions that when executed by a machine processor cause the machine to carry out specified functionality; discrete or integrated circuits configured to carry out the specified functionality; and machine/device/computer storage media configured with instructions that when executed by a machine processor cause the machine to carry out specified functionality. Logic specifically excludes software per se, signal media, and transmission media.

"Articulation metric" refers to audio features indicative of clear speech articulation. Examples of articulation metrics include first and second formant measurements of produced vowels and consonants, size of articulation, and their formant dispersion. Certain phonetically-rich words and phrases may be particularly useful for analysis of articulation. One type of algorithm for generating articulation metrics is a mixed density network, a class of models obtained by combining a conventional neural network with a mixture density model. Many other techniques for measuring articulation from audio signals are known in the art and applicable. "Neural network" refers to an algorithm or computational system based on a collection of connected units or nodes called artificial neurons, which loosely model the neurons in a biological system. Each connection between neurons, like the synapses in a biological brain, can transmit a signal (an activation) from one artificial neuron to another. An artificial neuron that receives a signal (the input activation) can process it and then signal additional artificial neurons (the output activation) connected to it. "Output activation" refers to an activation output by a neuron in a neural network. An output activation is typically computed based on the input activations to the neuron and the weights applied to the input activations. "Enunciation metric" refers to a value indicative of effective articulation by a speaker regarded from the point of view of its intelligibility to the audience. "Tonal variance" refers to the variance of pitch in speech to distinguish lexical or grammatical meaning—that is, to distinguish or to inflect words. "Support vector machine" refers to a class of supervised learning models with associated learning algorithms that analyze data used for classification and regression analysis. A support vector machine may be abbreviated as SVM. Given a set of training examples, each marked as belonging to one or the other of two categories, an SVM training algorithm builds a model that assigns new examples to one category or the other, making it a non-probabilistic binary linear classifier. Techniques such as Platt scaling extend SVMs to apply a probabilistic classification. An SVM model is a representation of the examples as points in space, mapped so that the examples of the separate categories are divided by a clear gap. New examples are then mapped into that same space and predicted to belong to a category based on which side of the gap they fall.

In addition to performing linear classification, SVMs can efficiently perform a non-linear classification using what is called the kernel trick, implicitly mapping their inputs into high-dimensional feature spaces.

The audio analyzer similarly converts an audio signal accompanying the video signal into predictions of human speech features such as articulation and enthusiasm.

"Supervised learning" refers to an algorithm that maps an input to an output based on example input-output pairs. A supervised learning algorithm infers a mapping from labeled training data consisting of a set of training examples. In supervised learning, each sample is a pair comprising an input (typically a vector) and a desired output value (also called the supervisory signal). A supervised learning algorithm analyzes the training data and produces an inferred function, which can be used for mapping new (non-training) inputs to classes or predictions. "Weights" refers to values with which activations are multiplied to increase or decrease the impact of the activation values in an activation function. "Activations" refers to the output values of neurons in a neural network computed based at least in part on weights input to the neuron and an activation function of the neuron. Activations are also called 'activation values'. "Input activation" refers to an activation received by a neuron in a neural network.

Through a speech-to-text converter the audio signal is further analyzed as text for items such as filler words, speech rate, content understanding, and optimal word choices. "Filler words" refers to a spoken sound or word indicating a pause to think without giving the impression of having finished speaking. Filler words are also sometimes called filled pauses, hesitation markers, or planners.

In American English, common filler sounds are ah, uh, and um. Among younger speakers, the fillers "like", "you know", "I mean", "okay", "so", "actually", "basically", and "right" may be prevalent. "Speech-to-text converter" refers to logic to convert speech audio into textual content (words and sentences). Many commercial speech-to-text converters are available, as are some open source versions such as CMU Sphinx and Kaldi. Through application of a natural language processor, grammar and sentence structure can be analyzed. "Natural language processor" refers to logic to process and natural language data. A natural language is a language that has evolved naturally in humans through use and repetition without conscious planning or premeditation. Natural languages can take different forms, such as speech or signing. They are distinguished from constructed and formal languages, such as those used to program computers or to study logic.

Results from the video analyzer and audio analyzer are processed by a transformation module into performance vectors and subjected to combinatorial logic to integrate the vectors with prior performance vectors and arrive at a multi-session rubric. "Rubric" refers to an organized data set to promote the consistent application of learning expectations, learning objectives, or learning standards. The rubric is integrated by a recommendation module to compose a final report to the trainee. "Recommendation module" refers to logic generating suggested responses to features or behaviors identified in audio and video. Feedback from backpropagation logic is applied to the video analyzer and audio analyzer as a closed-loop control system to further refine the quality of recommendations. "Backpropagation" refers to an algorithm used in neural networks to calculate a gradient for updating the weights in the neural network. Backpropagation algorithms are commonly used to train neural networks. In backpropagation, a loss function calculates a difference between the actual outputs of the neural network and expected outputs of the neural network. "Loss function," also referred to as the cost function or error function (not to be confused with the Gauss error function), is a function that maps values of one or more variables onto a real number intuitively representing some "cost" associated with those values.

FIG. 1 depicts an embodiment of an interactive analytical system 100 by which captured video and audio inputs are transformed, combined, and analyzed to create a multi-session rubric.

Video signals are initially processed through a module, such as a video decoder, which produces a time-ordered sequence of video frames as an intermediate output. Such output includes various features subject to analysis in the subsequent modules, e.g., body gestures and facial expressions, to provide evaluation on respective skills. The video signal is captured either in real time or from a recording by a video analyzer 102. The video analyzer 102 processes video frames, individually and in time-ordered sequence, of the video signal to convert the video signal into a plurality of human morphology feature predictions, e.g., eye contact, expression, movement, gestures, and so on. Human body and hand locations and gestures may also be detected per frame or group of frames, and those key points across all frames construct the action trajectories of body (and hand) subject to later analysis.

A facial analysis module detects faces and corresponding facial landmark points in the video frames to extract facial features, used to yield analytical outputs such as gaze direction and micro-expressions. "Micro-expression" refers to an involuntary facial display of emotion that only lasts for a fraction of a second, sometimes as fast as ¹/₂₅th of a second. The person who has expressed a micro-expression may not aware that they have displayed an emotion through the micro-expression, and may even wish to conceal the emotion. When combined later into category scores using combinatorial logic 108, emotion analysis, such as anger, hesitation, passion, nervousness/confidence, and energy level can be predicted. "Category score" refers to a value resulting from a transformation of a feature vector into a scalar based on category-specific combinatorial logic. Those skilled in the art will appreciate that the human morphology features can include any other trainee features detectable with a camera, such as iris dilation, dressing etiquette, and so on. The visual, or morphology features from the converted video signal, together with speech features converted by an audio analyzer 104 from the video signal's accompanying audio track, serve as inputs to a transformational module 106.

The audio accompanying a video signal undergoes a different processing path before reaching the transformational module 106. A speech rate analysis is performed on the audio analyzer output to determine speech rate and flow; proper speech rate and flow are also related to the topic, context and target audience.

Audio from the video signal is converted to text via a conventional speech-to-text converter 112. The output of the speech-to-text converter 112 is analyzed to determine articulation. An articulation metric is generated based on the confidence of the analytical results of user's enunciation of words. The use of accents (e.g., different pronunciations in different contexts) may be supported in this module.

Various analyses are performed on the speech-to-text converter 112 output. A filter is applied to the text output to generate a filler words analysis. Conventional speech-to-text converter applications typically delete filler words from their textual output. However, in the disclosed system an audio waveform is retained and compared to the speech-to-text converter output for the purpose of capturing said filler words. A word diversity analysis is also performed on the text output to identify the trainee's choice of words. Finally, a similar content understanding analysis is performed on the text output to identify speech content and structure.

An imbedded linguistic module is also included to support the analysis of the structure and content of the user's delivery. Those skilled in the art will appreciate that other analyses may be performed on the audio signal, to detect attributes such as tone, pitch, quaver, etc. Respiration rate and other such information may also be determined from the audio data.

The text output from the speech-to-text converter 112 is then used as an input to a natural language processor 114. The natural language processor 114 modifies the text output from the speech-to-text converter 112, replacing filler words where necessary, and otherwise creating data suitable for processing by the language analyzer 120 using known techniques in the art for natural language processing. A grammar analysis is additionally applied by the language analyzer 120 to determine grammatical errors. Current grammatical suggestions are given based on the user's topic, context, and target audience. A linguistic dictionary is embedded in the language analyzer 120 to understand and evaluate the user's topic, intentions, and whether the user delivers the content properly by choosing optimal words. A similar content understanding analysis is performed by the language analyzer 120 to identify speech content and structure. Speech features such as grammar and sentence structure are extracted by the language analyzer 120, which then outputs speech features suitable as inputs to the transformational module 106.

The transformational module 106 processes morphology features received from the video analyzer 102 and speech features from the audio analyzer 104 to transform these features into a current multi-dimensional performance vector. The current multi-dimensional performance vector from the transformational module 106 also acts as feedback input to both the video analyzer 102 and audio analyzer 104. The transformational module 106 sends a session performance vector to a combiner applying combinatorial logic 108. Output vectors from the transformational module 106 are additionally sent to a database 110 where they can be additionally applied as other performance vector inputs to the combinatorial logic 108. Additional details on feedback inputs to the transformational module 106 from both the video analyzer 102 and audio analyzer 104 are explained in FIG. 2.

The combinatorial logic 108 receives a current multi-dimensional performance vector from the transformational module 106 along with an optional model control (e.g., model control 116) and other performance vectors from the database 110, which could also include relevant data derived from a subject's biological information, e.g., pulse, respiration, blood pressure, skin conductivity, etc. "Model control" refers to logic to control the behavior of combinatorial logic based on a model control setting. A model control setting is a configuration setting associated with a particular behavioral model, such as "sales pitch", "management training", "interviewing" and so forth. The model control 116 could additionally control the combinatorial logic 108 under guidance from model settings 118. The combinatorial logic 108 then integrates the current multi-dimensional performance vector and one or more prior multi-dimensional performance vectors to generate a multi-session composite rubric.

The combinatorial logic 108 comprises both supervised learning and unsupervised learning. "Unsupervised learning" refers to a class of self-organized Hebbian learning algorithms that identify patterns in a data set without pre-existing labels. Semi-supervised learning is a class of algorithms implementing a hybridization of supervised and unsupervised techniques. Two of the main techniques used in unsupervised learning are principal component analysis and cluster analysis. Supervised learning comprises a three-step process of labeling, score learning, and learning, to transform audio, video, and content features to multi-dimensional scores. Data labeling begins with communication professionals labeling existing videos on a 1-10 scale in 6 dimensions, including enthusiasm, engagement, articulation, pace, proper content, proper facial expression, and eye contact. Criteria standards are provided to the labeling professionals to ensure consistency. Average and standard deviations are gathered from each professional, and their outputs are then normalized. Each video is also labeled with an overall score in addition to the dimension scores. For score learning, a machine learning algorithm (typically a support vector machine) is used to learn a set of weights of 6-dimensional features to predict an overall score that minimizes the differences between human-labeled overall scores. This model will be used later to predict the overall score and provide it to the user. For learning to transform audio, video and content features to multi-dimensional scores, related audio, video, and speech content is first selected as feature sources for each of the 6 dimensions as follows: enthusiasm features—pitch signal, word2vec, word/second, and number of expression changes; articulation features—language model output, canny edge output, wave FT output, and MFCC output; confidence features—all other raw outputs; content features—language model output, word2vec, number of filler words, number of transitions, and number of emotional words; facial features—landmarks of facial points, number of happiness, and number of sadness; and eye contact features—eye ball trajectory. A machine learning model (support vector machine) is trained for each dimension to predict the manual labeled score in the data labeling phase above.

Unsupervised learning comprises five steps: videos are categorized based on their contexts (job interview, sale pitch, etc.); videos are clustered by use of a K-means algorithm on a 1-10 scale using raw features; features are chosen that can differentiate videos similarly to human rankings; the identified features set is used to train a new K-means model and predict a score as reference; and the video is manually reviewed if it has significantly differing scores between supervised learning and unsupervised learning.

All scoring methods are on a 1-10 scale for consistency. For features such as pace, pause, filler words, and so on, scoring may be based on expert knowledge, with an ideal 10/10 standard conforming to industry standards such as: ideal speech rate at 120-140 words per minute; 0-1 filler words per minute; and considering the ideal speech rate, average length of a sentence (12 words), an ideal pause rate at 8-10 pauses per minute, with an effective pause length of 0.5-2 seconds, depending on intention. Pauses can alternatively be evaluated through a combination of knowledge and supervised learning, since pauses should appear at the end of a sentence or phrase, rather than as a break within them. At the other end of the scale, the zero (0) thresholds include: a speech rate below 60 or above 200 and fewer than two pauses or extra-long pauses (i.e., longer than 5 seconds) in a given minute. Scoring from 1-9 is then scaled based on the minimum (0) and maximum (10) values.

Figure 2:
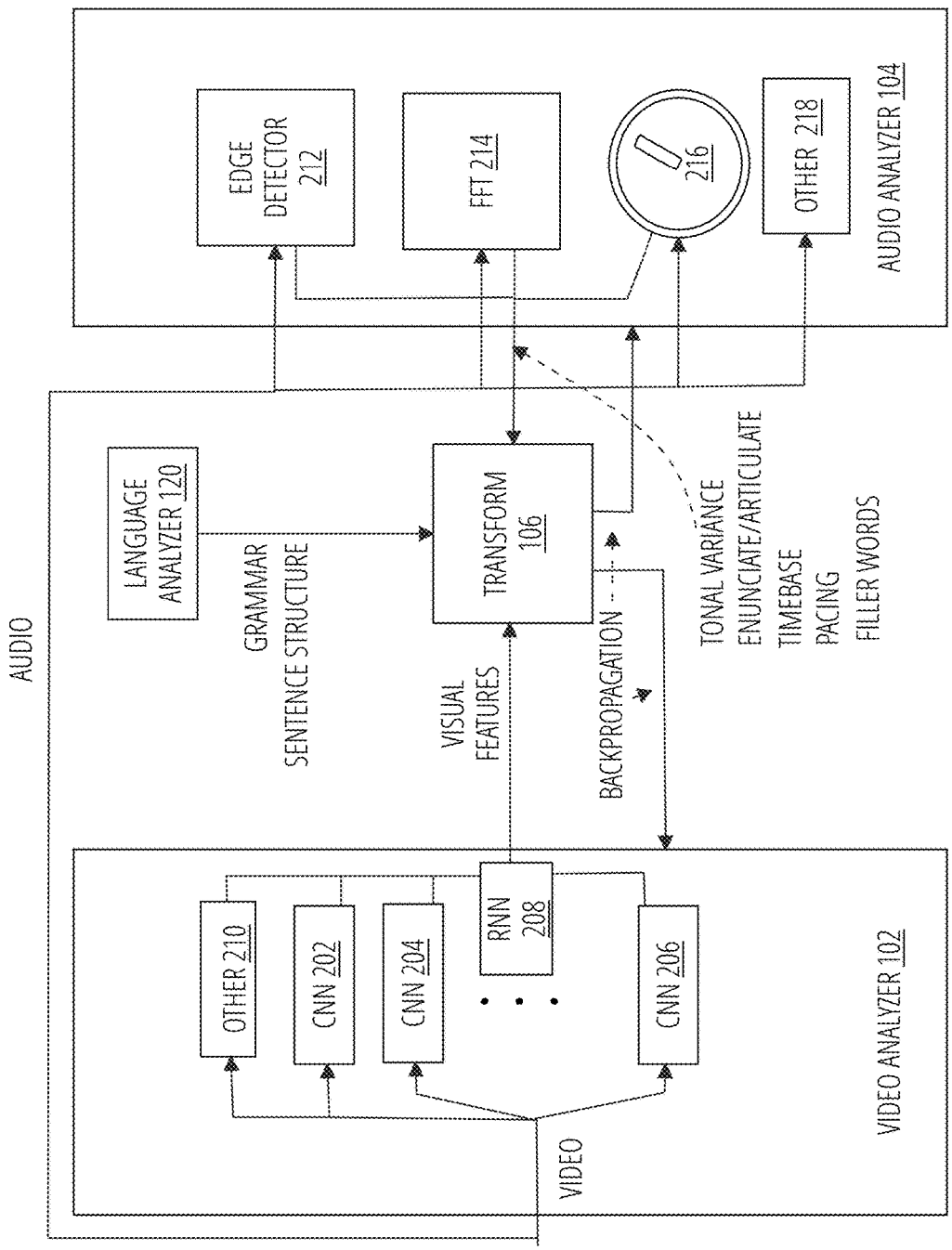
FIG. 2 depicts transformational module interfaces 200 in accordance with one embodiment.

FIG. 2 depicts exemplary transformational module interfaces 200 for processing operations within the video analyzer 102 and audio analyzer 104 and their respective feedback loops to the transformational module 106. Referring first to the video analyzer 102, the input video feed, consisting of individual video frames and time-ordered sequences of video frames, acts as input to a set of neural networks (e.g., convolutional neural network 202, convolutional neural network 204, . . . convolutional neural network 206). Each frame is applied in parallel to the convolutional neural networks to extract key point features at time or frame interval t (not every frame may be applied, some may be skipped). "Convolutional neural network" refers to a class of deep neural networks applied to analyzing images and video.

Convolutional neural networks may be referred to in abbreviated for as CNNs. CNNs utilize convolution filters within the featuring layers of the neural network in order to respond to progressively more abstract features of images or video. Each neural network may be trained to detect different types of features in the frame. For example, at least one of the neural networks may implement a gaze detector. "Gaze detector" refers to logic to determine a direction of a person's gaze. This is typically accomplished by analyzing the eyes for the orientation of the pupils. A gaze detector may be implemented by a video analyzer configured to recognize eye features, or by reflecting light off the eyes and measuring the angle of reflection or absorption.

Although the depicted embodiment uses neural network classifiers, other types of classifiers may also be utilized, such as random forest and support vector machine algorithms, for example. "Random forest" refers to an ensemble learning algorithm for classification, regression and other tasks that operates by constructing a multitude of decision trees at training time and outputting the class that is the mode of the classes (classification) or mean prediction (regression) of the individual trees. Random decision forests correct for decision trees' tendency toward overfitting to their training set. "Overfitting" refers to a configuration state in which the weights and other parameters of a neural network are so closely fitted to the training data set that the neural network performs poorly at generalizing to correctly classify features in non-training set inputs.

Time-ordered sequences of features extracted from the frames by the convolutional neural networks are applied to a recurrent neural network (e.g., recurrent neural network 208), which integrates outputs of the convolutional neural networks and analyzes them for temporal features. "Recurrent neural network" refers to a class of neural network in which connections between nodes form a directed graph along a temporal or otherwise ordered sequence to enable the classification of temporal dynamic behavior. The term 'recurrent neural network' may be abbreviated as RNN. RNNs maintain an internal state that acts as memory of prior and/or subsequent samples in a sequence. For example, the recurrent neural network 208 may integrate features from t=1 to t=T and output predictions of human morphology based on the evolution of the features in time. Other analysis algorithms 210 (e.g., known motion vector analysis algorithms, color analysis, etc.) can also provide inputs to the recurrent neural network 208 before the visual features are input to the transformational module 106. In some implementations some or all of the outputs of the convolutional neural networks and other analysis algorithms 210 may be applied directly to the transformational module 106 without being integrated by the recurrent neural network 208.

Referring to the audio analyzer 104, modules used in the analysis of audio waveforms are illustrated, to be leveraged in addition to the speech-to-text converter, natural language processor, and language analyzer 120, to generate audio feature inputs to the transformational module 106. Upon receiving the audio separated from the video input, the audio analyzer 104 utilizes an edge detector 212 using (for example) a canny edge detector algorithm in conjunction with a timebase 216 (effectively, a clock) to detect pronunciation clarity. "Canny edge detector" refers to a class of multi-stage algorithms to detect a wide range of edges in signals such as audio and image frames. A typical canny edge detector algorithm applies a Gaussian filter to smooth the signal in order to remove noise, identifies the intensity gradients of the signal, applies non-maximal suppression to spurious samples, applies a double threshold to determine potential edges, and tracks edges by hysteresis. Alternatives or supplements to the canny edge detector include neural networks trained to detect features in audio and/or images (e.g., facial features) indicative of articulation metrics and enunciation metrics, gradient detection algorithms, Man- Hildreth algorithms, surface fitting algorithms, and Hough Transform algorithms. Other audio analysis 218 may also be leveraged to create an audio waveform subject to a Fast Fourier Transform 214, which integrates these inputs, normalized to prevent bias, to create a representation of tonal variance, an enunciation metric, an articulation metric, the timebase, a vocal pacing metric and a representation of filler words. "Timebase" refers to a periodic signal providing a reference clock for events or features in audio or video content. The transformational module 106 can additionally receive grammar and sentence structure metrics from the language analyzer 120.

The transformational module 106 integrates the visual features and outputs of the audio analyzer 104 to generate multi-dimensional performance vectors. The performance vectors may be applied by backpropagation logic in a closed-loop fashion to train the video analyzer and the audio analyzer.

A table showing a correlation between performance vectors output by the transformational module 106 and a corresponding rubric output by the combinatorial logic 108 for a job interview is depicted below. The rubric may take the form of a Situation Task Action Result (STAR) generated for a particular segment of a job interview, such as when a user is asked to respond to: "Tell me about a time when you led a project".

An overall total score for the user may be generated as the average value of all output metrics. Feedback on a specific metric/subcategory may be formulated from a combination of the overall score and the user's timeline-based output values of the specific metric. Take for example the enthusiasm metric. This metric tracks how this user's enthusiasm level changes throughout the entire course of the presentation (video length). A final score for this metric is determined as an indication of how well the enthusiasm trajectory/allocation fits a best model. Specifically, for certain types of presentations, e.g., sales or training, one should be more enthusiastic at the beginning and ending of the presentation to draw attention from the audience. Thus the actual metric values and the arrangement/fluctuation of the metric values over the course of the presentation may be utilized and compared with the ideal (e.g., 10/10 standard) best model, and the personalized feedback may be generated by identifying behaviors associated (e.g., in a database) with bridging the gap between the user's performance metrics and the 10/10 standard-best model.

In the following tables the metrics in the All Output column may be identified as follows:

O1-body language, O2-eye contact, O3-smiling, O4-anger, O5-hesitation, O6-passion, O7-composure, O8-energy level, O9-articulation, O10-filler words, O11-speech rate, O12-flow, O13-grammar, O14-choice of words, O15-structure, and O16-content.

More or fewer metrics may be utilized as needed/useful in particular embodiments.

TABLE 1

| Presentation Performance | | |
|---|---|---|
| Rubric Category | Sub-Category | All Output |
| Passion | Show enthusiasm and vary your emotional tone | O4 |
| | | O5 |
| | | O6 |
| | Project and modulate the voice | O8 |
| | Use open gestures | O1 |
| | Demonstrate proper facial expressions | O3 |
| | Be confident and show no nervousness | O7 |

TABLE 1-continued

| Presentation Performance | | |
|---|---|---|
| Rubric Category | Sub-Category | All Output |
| Content | Answer key audience questions regarding the topic | O16 |
| | Provide quantitative and qualitative support | O16 |
| | Use storytelling effectively | O16 |
| | Limit main points to three or four | O15 |
| | Use transitions and summaries | O15 |
| | Have a clear introduction and conclusion | O16 |
| Engagement | Maintain eye contact | O2 |
| | Avoid filler words and "double clutching" | O10 |
| | Speak at a proper pace | O11 |
| | Pronounce words clearly | O9 |
| | Speak with a pleasant flow | O12 |

TABLE 2

| Pitch Performance | | |
|---|---|---|
| Rubric Category | Sub-Category | All Output |
| Passion | Show enthusiasm and vary your emotional tone | O4 |
| | | O5 |
| | | O6 |
| | Project and modulate the voice | O8 |
| | Use open gestures | O1 |
| | Demonstrate proper facial expressions | O3 |
| | Be confident and show no nervousness | O7 |
| Content | Company and Product-clearly identifies the company name, product or what the company does | O16 |
| | Problem and Solution-Shows deep understanding of the problems and clearly explains the solution | O16 |
| | Market opportunity-Shows insights into the market, industry trends, and how the company's solution will fill the void | O16 |
| | Revenue Model-Clearly describes how the firm will earn revenue and from whom | O16 |
| | Team-Explains how the funding team's expertise will solve the problem or meet this opportunity | O16 |
| | Competition-Addresses current and potential competitors | O16 |
| | Competitive Advantage-Explains the company's secret sauce/unique selling points | O16 |
| Engagement | Maintain eye contact | O2 |
| | Avoid filler words and "double clutching" | O10 |
| | Speak at a proper pace | O11 |
| | Pronounce words clearly | O9 |
| | Open the pitch by getting the audience's attention with a "hook" | O15 |
| | | O16 |
| | End with an "ask" | O15 |
| | | O16 |
| | Speak with a pleasant flow | O12 |

TABLE 3

| Job Interview Performance | | |
|---|---|---|
| Rubric Category | Sub-Category | All Output |
| Passion | Show enthusiasm and vary your emotional tone | O4 |
| | | O5 |
| | | O6 |
| | Project and modulate the voice | O8 |
| | Use open gestures | O1 |
| | Demonstrate proper facial expressions | O3 |
| | Be confident and show no nervousness | O7 |

TABLE 3-continued

Job Interview Performance

| Rubric Category | Sub-Category | All Output |
|---|---|---|
| Content | Allocate the content in a good logical structure | O15 |
| | Quantify the results and benefits you achieved | O16 |
| | Give direct, specific, and complete answers-avoid banalities | O16 |
| | Be diplomatic-avoid criticizing anyone, even yourself | O16 |
| | Show knowledge and insights in your answers | O16 |
| | Explain how your skills satisfy the job's requirements-connect the dots | O16 |
| Engagement | Maintain eye contact | O2 |
| | Dress appropriately for the industry and position | Computer vision, computing flow same as O1 |
| | Avoid filler words and "double clutching" | O10 |
| | Speak at a proper pace | O11 |
| | Pronounce words clearly | O9 |
| | Speak with a pleasant flow | O12 |

After processing, a composite rubric in the form of a report is generated for one session or as part of a coached training regime (multiple sessions for an individual or across a group). A sample report is depicted below:

TABLE 4

Sample Report

| Rubric Category | Sub-category | Sample Score | Sample Feedback |
|---|---|---|---|
| Passion | Show enthusiasm and vary your emotional tone | 2 | Force yourself to smile or frown during rehearsal |
| | Project and modulate the voice | 4 | During rehearsal, identify three additional sections that require vocal stress to differentiate them from other passages |
| | Use open gestures | 3 | During rehearsal, increase your open gestures by 50% as compared to other presentations |
| | Demonstrate proper facial expressions | 5 | Imagine that the audience requires your facial expressions to fully understand your message |
| | Be confident and show no nervousness | 6 | In rehearsal, make sure you stand erect with shoulders back when presenting |
| Content | Answer key audience questions regarding the topic | 7 | Make sure you adequately answer all key audience questions |
| | Provide quantitative and qualitative support | 9 | Ensure that you are defining key terms |
| | Use storytelling effectively | 10 | Ensure that you are also using effective quantitative support for your key points |
| | Limit main points to three or four | 5 | Evaluate the clarity of the overall structure of your presentation |
| | Use transitions and summaries | 7 | Increase your transitions between main points by 10-15% |
| | Have a clear introduction and conclusion | 8 | Focus on an attention-grabber and initial summary in the introduction |

TABLE 4-continued

Sample Report

| Rubric Category | Sub-category | Sample Score | Sample Feedback |
|---|---|---|---|
| Engagement | Maintain eye contact | 6 | Ensure that you establish eye contact with all members/sections of your audience |
| | Avoid filler words and "double clutching" | 3 | Get comfortable with brief moments of silence rather than vocalized pauses |
| | Speak at a proper pace | 4 | In rehearsal, randomly vary your speaking rate, above and below 120 works per minute |
| | Pronounce words clearly | 7 | Use simple and familiar words in your presentation |
| | Speak with a pleasant flow | 4 | Use pause properly to emphasize your key points |

Figure 3:
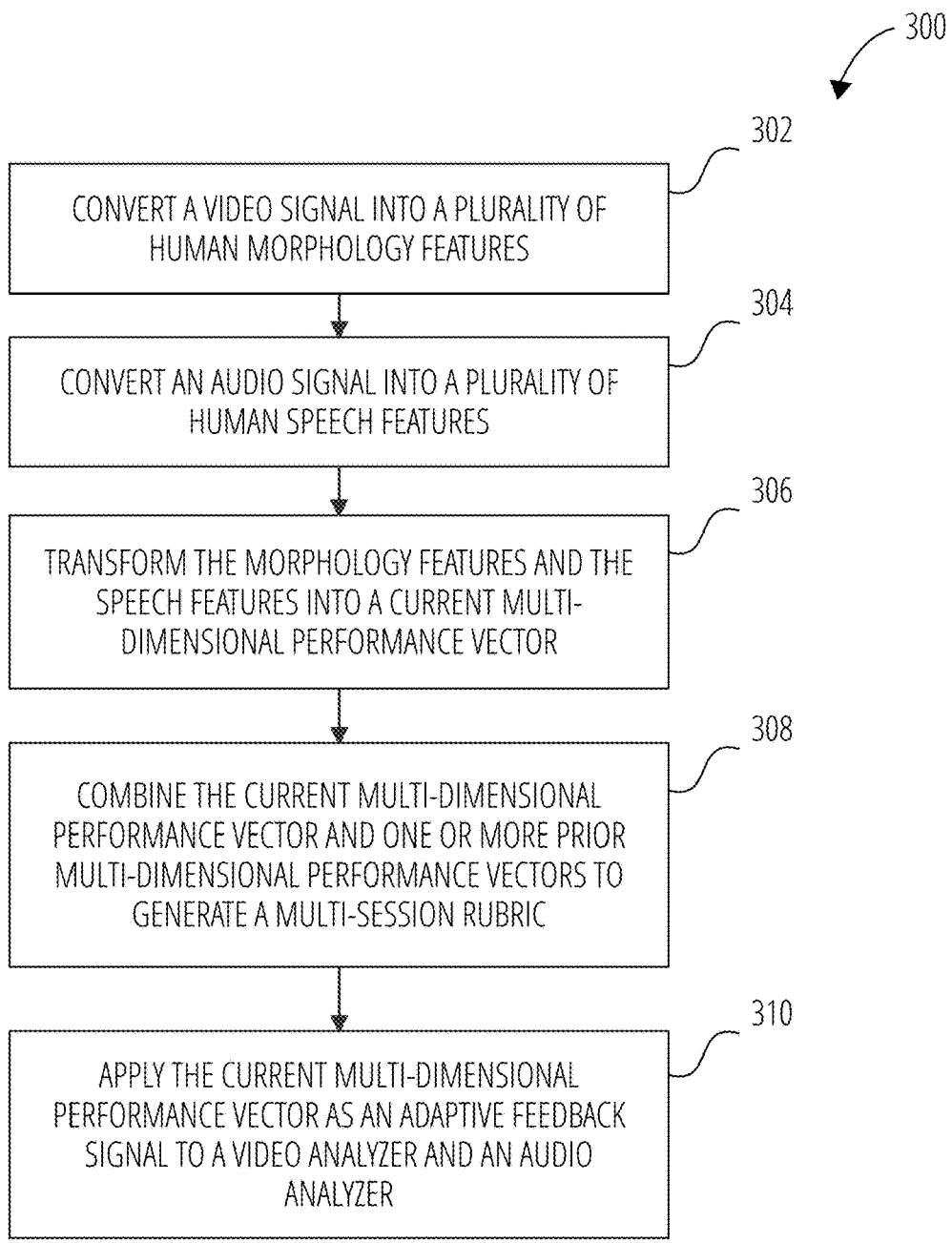
FIG. 3 depicts a communication training process 300 in accordance with one embodiment.

Referring to FIG. 3, a communication training process 300 is depicted in one embodiment. At block 302 a video signal is converted into a plurality of human morphology features; at block 304 convert an audio signal into a plurality of human speech features. At block 306 transform the morphology features and the speech features into a current multi-dimensional performance vector. With a multi-dimensional performance vector obtained, at block 308 combine the current multi-dimensional performance vector and one or more prior multi-dimensional performance vectors to generate a multi-session rubric. At block 310 apply the current multi-dimensional performance vector as an adaptive feedback signal to a video analyzer and an audio analyzer.

Figure 4:
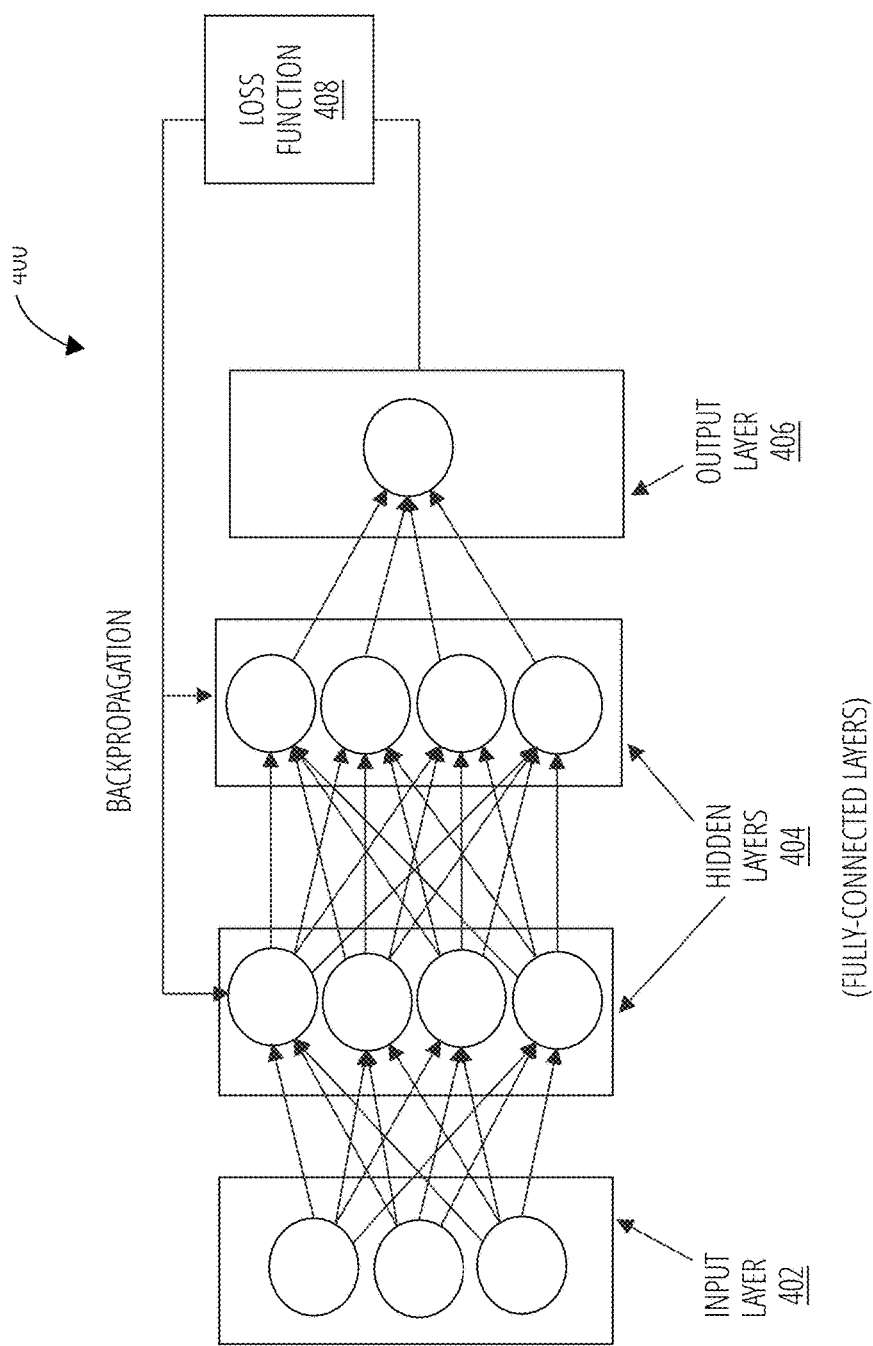
FIG. 4 depicts a basic deep neural network 400 in accordance with one embodiment.

The neural networks utilized for feature extraction from images as discussed in conjunction with FIG. 1 are deep neural networks. "Deep neural network" refers to a neural network with one or more hidden layers. Referring to the basic deep neural network 400 depicted in FIG. 4, a collection of connected units or nodes called artificial neurons loosely model the neurons in a biological brain. Each connection, like the synapses in a biological brain, can transmit a signal from one artificial neuron to another. An artificial neuron that receives a signal can process it and then signal additional artificial neurons connected to it.

In common implementations, the signal at a connection between artificial neurons is a real number, and the output of each artificial neuron is computed by some non-linear function (the activation function) of the sum of its inputs. The connections between artificial neurons are called 'edges' or axons. Artificial neurons and edges typically have a weight that adjusts as learning proceeds. The weight increases or decreases the strength of the signal at a connection. Artificial neurons may have a threshold (trigger threshold) such that the signal is only sent if the aggregate signal crosses that threshold. Typically, artificial neurons are aggregated into layers. Different layers may perform different kinds of transformations on their inputs. Signals travel from the first layer (the input layer 402), to the last layer (the output layer 406), possibly after traversing one or more intermediate layers, called hidden layers 404.

Figure 5:
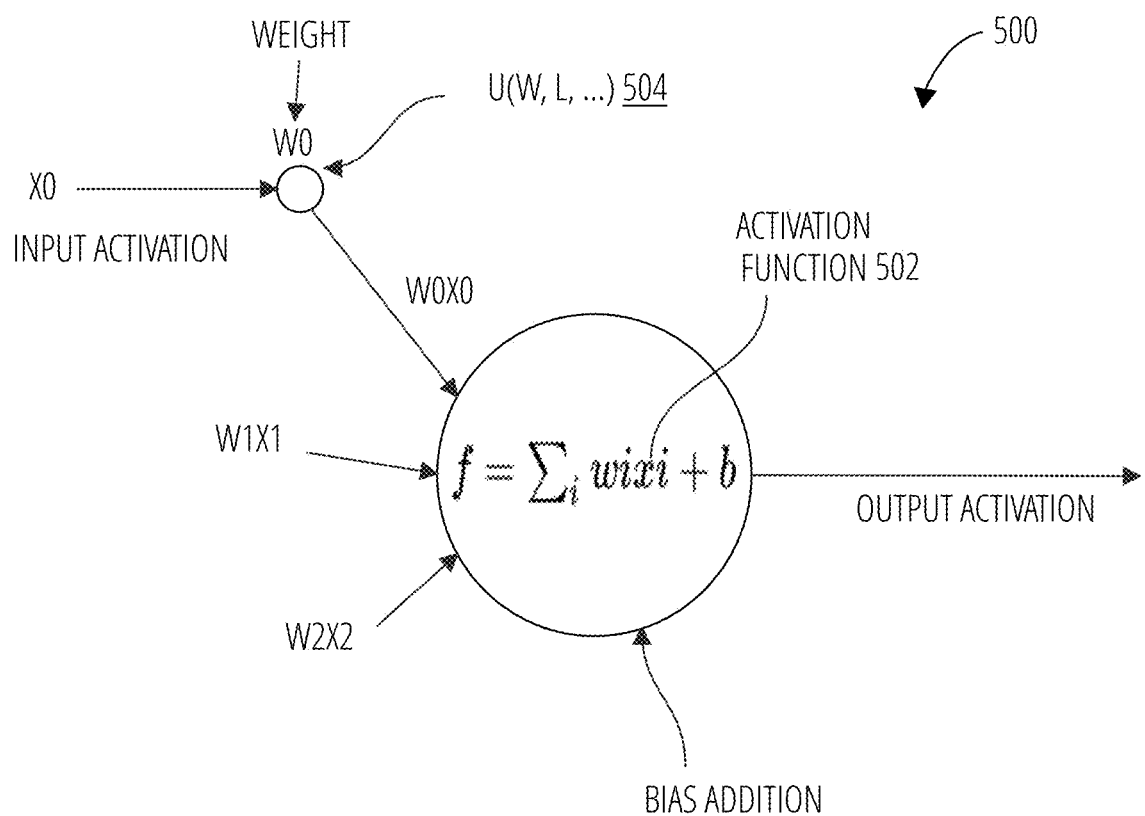
FIG. 5 depicts an artificial neuron 500 in accordance with one embodiment.

Referring to FIG. 5, an artificial neuron 500 in one of the hidden layers of a deep neural network receives inputs $x_i$ (input activations) from predecessor neurons. "Hidden layer" refers to a layer of a neural network that is neither an input layer nor an output layer. "Output layer" refers to the final layer of a neural network that generates the classification(s) of the values applied to the input layer. Weights $w_i$ are applied to these inputs along with an optional threshold (b), which stays fixed unless changed by a learning function.

"Input layer" refers to the first layer of a neural network that receives the input values to analyze and classify. An activation function 502 computes the output of the neuron from the weighted neuron inputs and threshold, if any. Additionally, bias addition may be applied. "Bias addition" refers to inclusion of a bias (e.g., a fixed output value or increment to an output value) for one or more neurons of a neural network layer. Bias addition is a technique for ensuring that at least one neuron of a layer produces a non-zero activation to a next layer when the layer does not detect any features in its inputs. The resulting neuron outputs are applied as activations (inputs) to a subsequent layer of the neural network, if any. Examples of an activation function are the sigmoid function and the hyperbolic tangent function. "Hyperbolic tangent function" refers to a function of the form $\tan h(x) = \sin h(x)/\cos h(x)$. The tan h function is a popular activation function in artificial neural networks. Like the sigmoid, the tan h function is also sigmoidal ("s"-shaped), but instead outputs values within the range (−1, 1). Strongly negative inputs to the tan h will map to negative outputs and only zero-valued inputs map to near-zero outputs. These properties make the neural network less likely to get "stuck" during training. "Sigmoid function" refers to a function of the form $f(x) = 1/(\exp(-x))$. The sigmoid function is used as an activation function in neural networks. It has the property of mapping a wide range of input values to the range (0,1) or sometimes to (−1,1).

A neuron in an input layer has no predecessor but serves as input interface for the whole network. Similarly an output neuron has no successor and thus serves as output interface of the whole network.

The network includes connections, each connection transferring the output of a neuron in one layer to the input of a neuron in a next layer. Each connection carries an input x and is assigned a weight w.

The activation function 502 often has the form of a sum of products of the weighted values of the inputs of the predecessor neurons.

The learning rule is applied along with the backpropagation of the loss function (e.g., loss function 408) as a rule or an algorithm which modifies the parameters of the neural network, in order for a given input to the network to produce a favored output. The learning process typically involves modifying one or more of the weights with a weight update function 504, thresholds of the neurons, and connections within the network. One example of a learning rule is the Adam optimization algorithm. "Adam optimization algorithm" refers to an alternative to stochastic gradient descent algorithms for updating neural network weights iteratively based on training data. Stochastic gradient descent maintains a single learning rate (termed alpha) for all weight updates, and the learning rate does not change during training. With an Adam optimization algorithm, a learning rate is maintained for each network weight (parameter) and separately adapted as learning unfolds.

Adam combines advantages of two variations of stochastic gradient descent: Adaptive Gradient Algorithm (AdaGrad) and Root Mean Square Propagation (RMSProp). AdaGrad maintains a per-parameter learning rate that improves performance on problems with sparse gradients (e.g. natural language and computer vision problems). RMSProp also maintains per-parameter learning rates that are adapted based on the average of recent magnitudes of the gradients for the weight (e.g. how quickly it is changing). RMSProp performs well on online and non-stationary problems (e.g. noisy).

Adam realizes benefits of both AdaGrad and RMSProp. Instead of adapting the parameter learning rates based on the average first moment (the mean) as in RMSProp, Adam also makes use of the average of the second moments of the gradients (the uncentered variance). Adam calculates an exponential moving average of the gradient and the squared gradient, and the parameters beta1 and beta2 control the decay rates of these moving averages. The initial value of the moving averages, and beta1 and beta2 values close to a value of 1.0 (recommended), result in a bias toward zero of moment estimates. This bias is overcome by first calculating the biased estimates, then calculating bias-corrected estimates.

Figure 6:
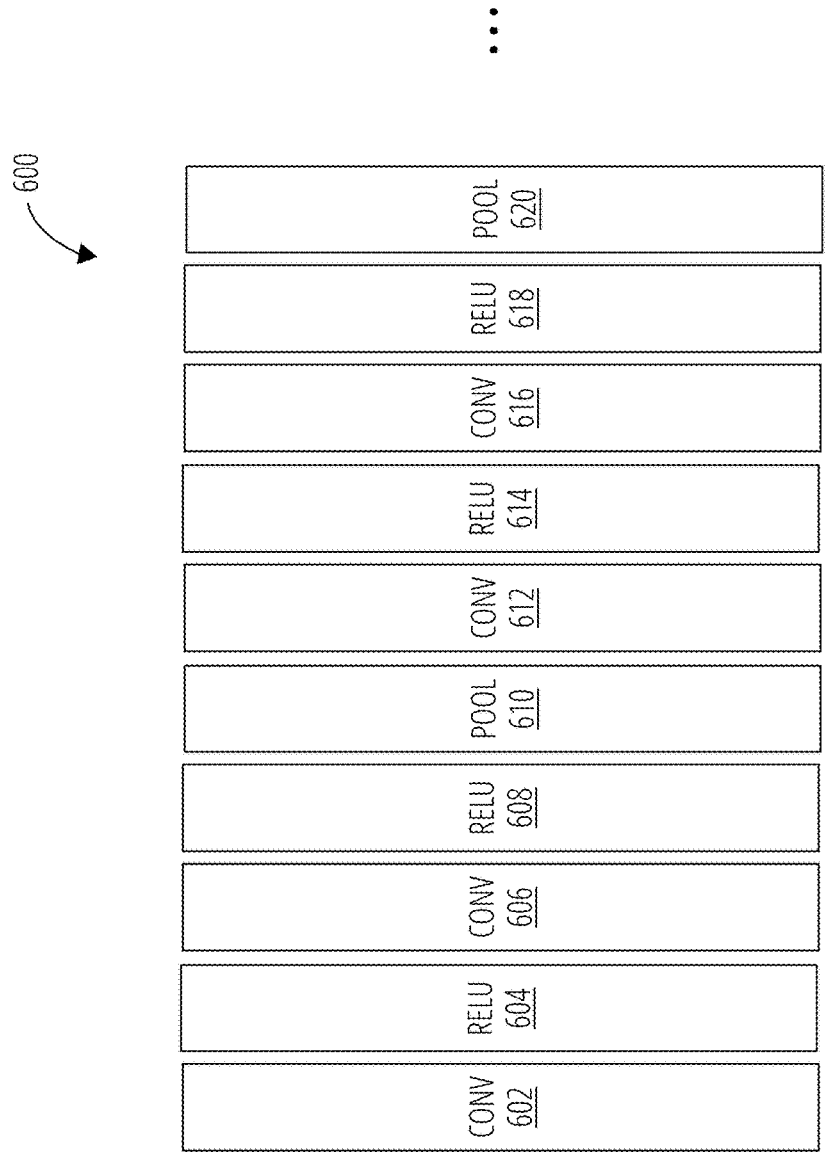
FIG. 6 depicts a convolutional neural network 600 in accordance with one embodiment.

An embodiment of a convolutional neural network 600 architecture that may be utilized in the disclosed systems is depicted in FIG. 6. The convolutional neural network 600 is a type of deep neural network that implements a deep learning algorithm. "Deep learning" refers to a class of artificial intelligence algorithms that imitate the workings of biological neural networks in processing data and creating patterns for use in decision making. Deep learning is a subset of machine learning utilizing artificial neural networks capable of learning based on experience, usually, initially, from a training data set. Deep learning is often implemented using deep neural networks. It includes an input layer, an output layer (which may be a fully-connected layer), and hidden layers, including pooling layers and ReLU activation layers. "ReLU" refers to a rectifier function, an activation function defined as the positive part of its input. It is also known as a ramp function and is analogous to half-wave rectification in electrical signal theory. ReLu is a popular activation function in neural network. "Pooling layer" refers to a layer in the neural network combining the outputs (activations) of neuron clusters from a previous layer into a single neuron in the next layer. "Fully-connected layer" refers to a layer of the neural network in which each of the neurons have connections to all activations in the previous layer. The output layer outputs classification predictions for features that the convolutional neural network 600 is trained to recognize in video frames. In a simple case, the predictions are provided in the form of a one-hot vector; in other cases, multiple predictions or predictions on a scale of values (e.g., 0-1) are output. "One-hot vector" refers to a vector in which exactly one value is set, and the other values are not set. An example of a one-hot vector is [0, 0, 1, 0]. A common output activation algorithm is Softmax. "Softmax" refers to a function of the form $f(x_i) = \exp(x_i)/\text{sum}(\exp(x))$ where the sum is taken over a set of x. Softmax is used at different layers (often at the output layer) of artificial neural networks to predict classifications for inputs to those layers. Softmax calculates the probabilities distribution of the event xi over 'n' different events. In a general sense, this function calculates the probabilities of each target class over all possible target classes. The calculated probabilities are helpful for predicting that the target class is represented in the inputs. An advantage of Softmax is the output probabilities range. The range will be (0,1), and the sum of all the probabilities will be equal to one. If Softmax is used with a multi-classification model, it returns the probabilities of each class the neural network is trained for, and configured target classes will have the high probability. Softmax computes the exponential (e-power) of the applied input and the sum of exponential values of all the values in the inputs. Then, the ratio of the exponential of the applied input and the sum of exponential values becomes the output of Softmax.

The initial convolution layer 602 stores the raw image pixels of the video frames and the final pooling layer 620 determines the performance scores/predictions. Each of the intermediate convolution layers (convolution layer 606, convolution layer 612, and convolution layer 616) and rectifier (ReLU) activations (RELU layer 604, ReLU layer 608, ReLU layer 614, ReLU layer 618) and intermediate pooling layers (pooling layer 610, pooling layer 620) along the processing path is shown as a column.

The convolutional neural network 600 architecture replaces the large single-layer filters of basic CNNs with multiple sized filters applied in series between layers. With a given receptive field (the effective area size of input image on which output depends), multiple stacked smaller size filters may perform better at image feature classification than a single layer with a larger filter size, because multiple non-linear layers increase the depth of the network which enables it to learn more complex features.

Figure 7:
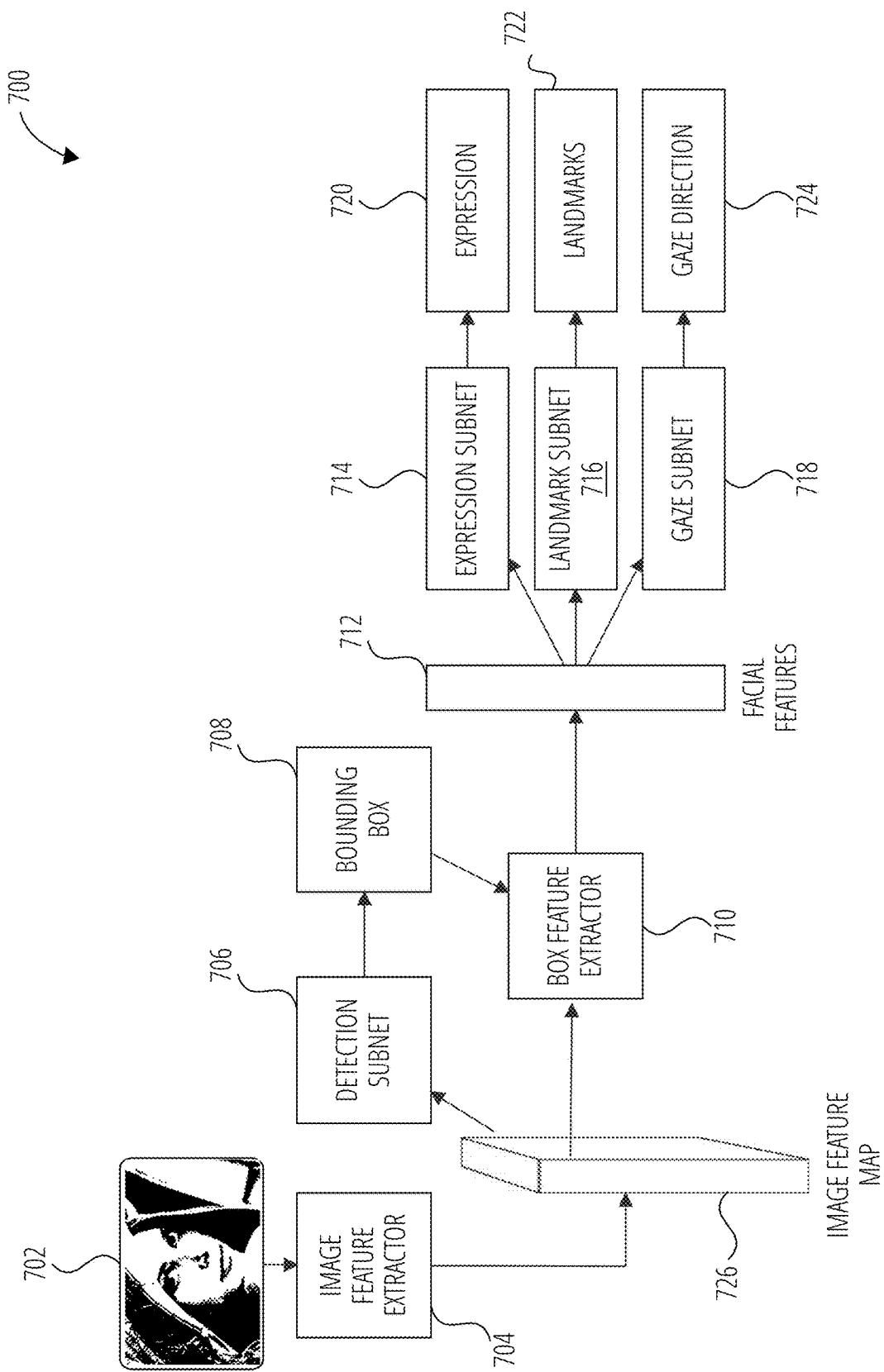
FIG. 7 depicts a convolutional neural network architecture 700 in accordance with one embodiment.

FIG. 7 depicts a convolutional neural network architecture 700 that may be utilized in the disclosed embodiments. The individual convolutional neural networks depicted in FIG. 1 may be implemented as sub-networks of a front end neural network or other algorithm comprising an image feature extractor 704 that receives a video frame 702 and which transforms the video frame 702 into an image feature map 726. The image feature map 726 in turn is applied to a detection subnet 706 which determines and outputs a bounding box 708 for a face in the video frame 702. The box feature extractor 710 receives the image feature map 726 and the bounding box 708 and transforms these inputs into facial features 712 (e.g., by cropping and resizing the image feature map 726 to the boundaries of the bounding box 708). Each of the facial features 712 thus predicted is subject to three additional convolutional neural networks: an expression subnet 714 to estimate/predict a facial expression 720, a landmark subnet 716 to detect landmarks 722, and a gaze subnet 718 to predict a gaze direction 724.

The expression subnet 714, the landmark subnet 716 and the gaze subnet 718 may be jointly trained using supervised learning with a facial dataset in which each training image includes a manually labeled expression, manually labeled landmark key points, and a manually labeled gaze direction.

Figure 8:
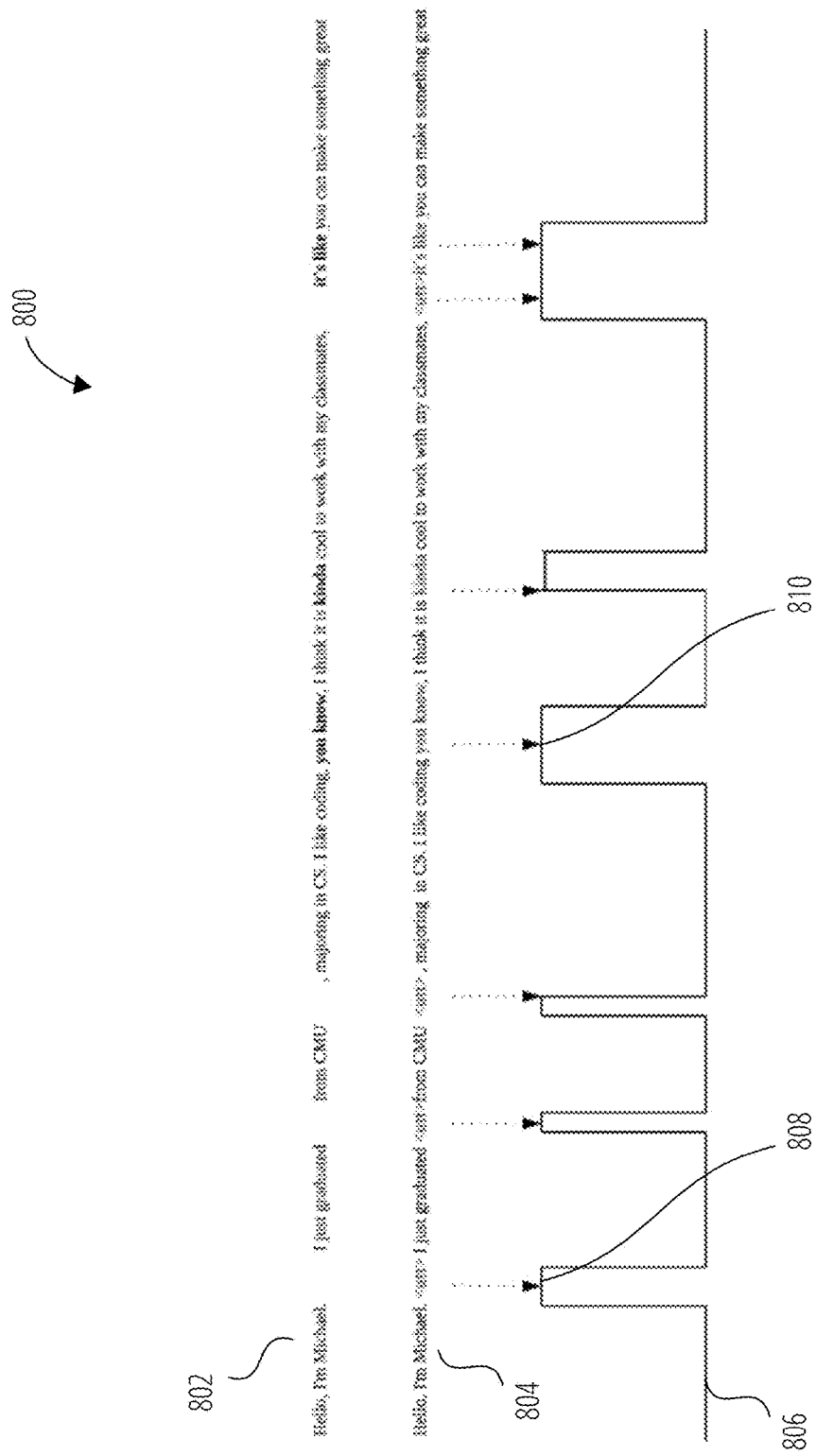
FIG. 8 depicts a filler word replacement process 800 in accordance with one embodiment.

FIG. 8 depicts a filler word replacement process 800 in one embodiment to allow filler words present in the raw audio input to be re-inserted into speech-to-text (STT) output. A standard speech-to-text converter removes most filler words for the purpose of readability. An example of STT output without utterances 802 illustrates that utterances (e.g., "uh", "um") have been removed, while other filler words (e.g., "you know", "kinda") are retained. "Utterance" refers to a subset of filler words referring to a vocal expressions not typically retained in speech-to-text conversion, e.g., "um", "err". The filler words in this instance are highlighted (as shown) after being compared to a database containing said filler words for identification. Said highlighted words are additionally timestamped to track their location in the output. Because a standard speech-to-text converter is primarily concerned with readability, utterances, or the subset of filler words or expressions unrelated to readability (e.g., those present in the filler word database), are removed.

The disclosed systems utilize filler words, including utterances, as inputs to downstream processing such as the natural language processor 114, language analyzer 120 and audio analyzer 104 to provide scores for attributes such as pacing metrics and articulation metrics back to the user. Filler words removed by a standard speech-to-text converter are therefore be re-inserted for this purpose. A comparison of the retained audio wave signal 806 to the highlighted and timestamped filler words from a standard speech-to-text converter (above) identifies utterances not recognized as filler words by the standard speech-to-text converter. A filler word in wave signal 810 is identified by its timestamp and distinguished from an utterance in wave signal 808. Said utterances are thereby re-inserted to create STT output with utterances 804, representing speech-to-text output including all filler words including utterances (illustrated as "<utt>").

Figure 9:
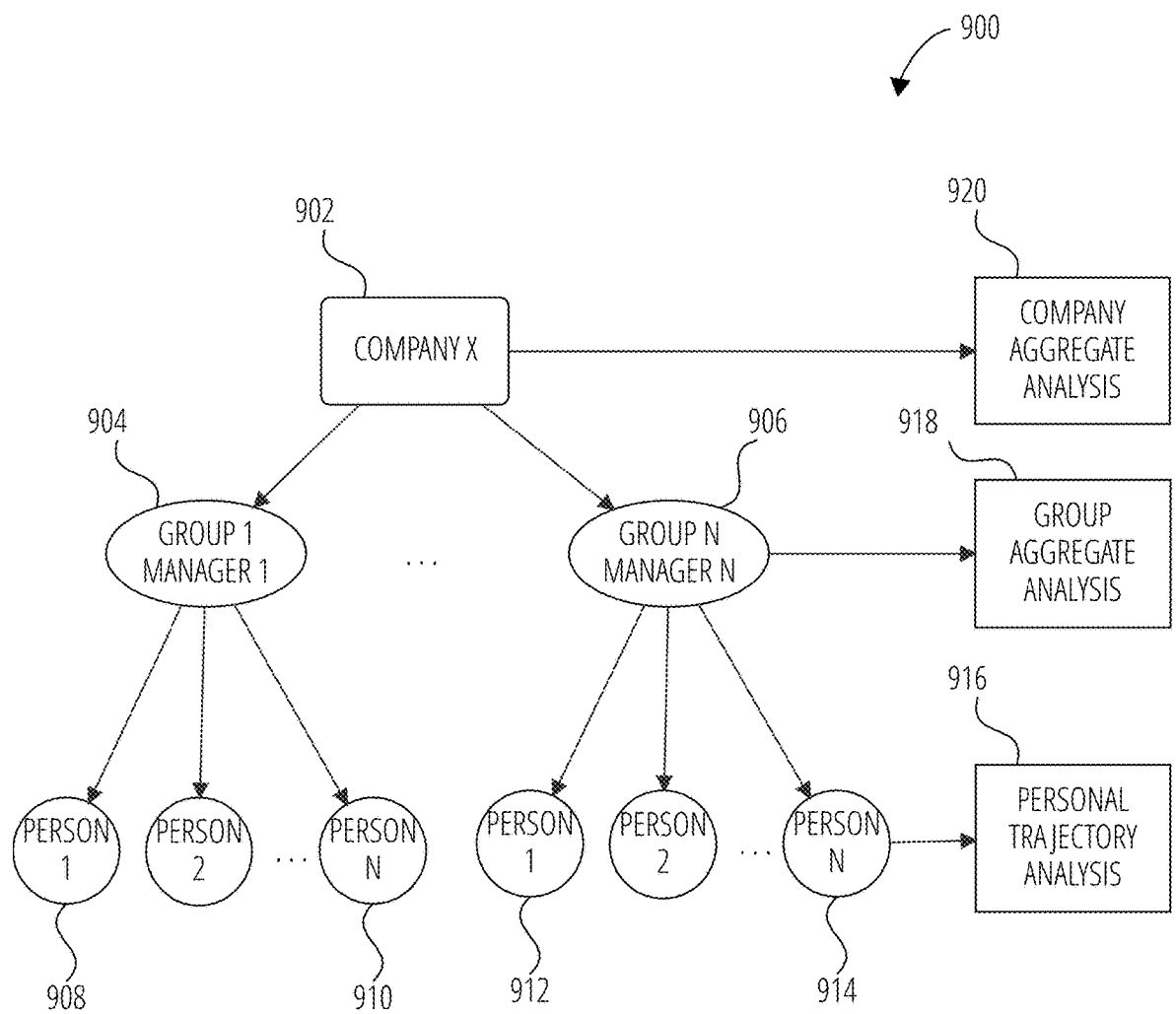
FIG. 9 depicts company-wide learning aggregation 900 in accordance with one embodiment.

FIG. 9 depicts a company-wide learning aggregation 900 that illustrates an example of how individual session performance metrics may be aggregated on a group or company level. Rubric results for an individual within a group, such as Person 1 908, Person N 910, Person 1 912 or Person N 914 can be displayed on an individual basis, as described elsewhere in this disclosure, or aggregated into a personal trajectory analysis 916. An individual, group, company, course, lesson, and so forth can be assigned a unique identifier to track their rubric results. Based on these identifiers, discrete rubric results can be analyzed and displayed in a variety of forms: e.g., courses completed, certificates and skillsets achieved, feedback and advice provided, along with retention of an individual's history of coursework and analyses.

On a group basis, the rubric results from a collection of individuals, e.g., Person 1 908, Person 2, up to Person N 910, could be organizationally aggregated and managed by a Group 1 Manager 1 904. Rubric results for a group can be analyzed and displayed in a variety of forms, e.g., courses completed, certificates and skillsets achieved, feedback and advice provided, along with retention of the history of coursework and analyses for all persons in a group. For an individual, a personal trajectory analysis 916 may be generated from the results over multiple individual sessions.

On a company basis (e.g., Company X 902), the rubric results from a collection of groups, e.g., Group 1 Manager 1 904 to Group N Manager N 906, could be organizationally aggregated as a group aggregate analysis 918 or a company aggregate analysis 920. Rubric results for a collection of groups can be analyzed and displayed in a variety of forms, e.g., courses completed, certificates and skillsets achieved, feedback and advice provided, along with retention of the history of coursework and analyses for the collection of groups.

Figure 10:
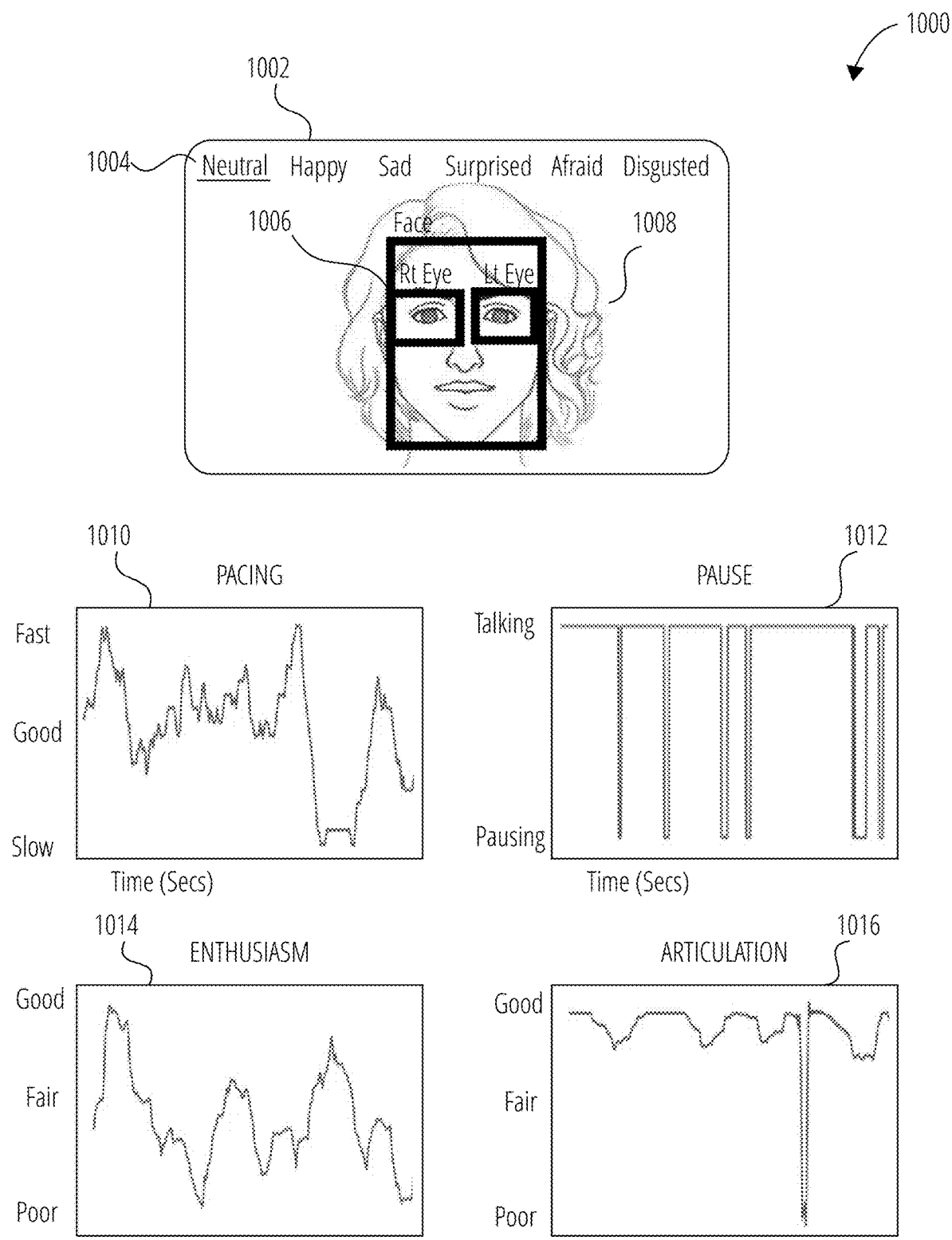
FIG. 10 depicts concurrent feedback interfaces 1000 in accordance with one embodiment.

FIG. 10 depicts concurrent feedback interfaces 1000 in one embodiment, visualizing the real-time display of video and audio metrics based on a concurrent video and audio recording. A subject 1008 is recorded by a video recorder, a device recognizable by those skilled in the art for capturing video signals and audio signals at sufficient resolutions for later analysis. Each video signal frame 1002 (or selected frames) of the video is processed by the video analyzer for feature detection. The face detection module display 1006 (as a visual subset of the subject 1008) provides a means to capture and analyze human morphology features, including but not limited to facial expression and eye contact, on a concurrent basis with the capture of the video signal and accompanying audio signal. As shown in the face detection module display 1006, the entire face is visually isolated as is the left eye and right eye. An emotion detector display 1004 additionally provides feedback on the current emotion shown by the subject 1008 based on a facial expression evaluation.

As the subject 1008 moves and speaks and a video signal is created, a series of metrics forming elements of a performance vector is concurrently created, recorded and displayed on time plot graphs as concurrent feedback interfaces 1000. A speech rate pacing metric 1010 graph displays the rate at which the subject 1008 is speaking within a calibrated range (e.g., "fast", "good", "slow") over time. An enunciation metric 1012 graph captures and displays the lengths of pauses in speech, e.g., when the subject 1008 is either "talking" or "pausing" over time. An enthusiasm metric 1014 graph uses both visual and audial data to score a subject 1008 according to a calibrated enthusiasm metric range ("good", "fair", "poor"). "Enthusiasm metric" refers to a value indicative of a level of enthusiasm conveyed by a person. An enthusiasm metric may be generated using combinatorial logic on a variety of inputs such as emotion, tone, pacing, and other factors. Finally, an articulation metric 1016 graph also scores a subject on this metric according to an articulation metric range ("good", "fair", "poor"). Concurrent feedback through interfaces graphing specific visual and speech attributes would allow the subject 1008 to adjust personal morphology and speech features in real time and observe their quantitative effects in a virtuous feedback cycle.

Software Embodiments

The systems disclosed herein, or particular components thereof, may in some embodiments be implemented as software executed on one or more devices. By way of example, components of the disclosed systems may be implemented as an application, an app, drivers, or services. In one particular embodiment, the system is implemented as a service that executes as one or more processes or tasks on a server device so as to provide the described capabilities to one or more client devices over a network. However, the system need not necessarily be accessed over a network and could, in some embodiments, be implemented by one or more apps or applications on a single device or distributed between a mobile device and a computer, for example.

Figure 11:
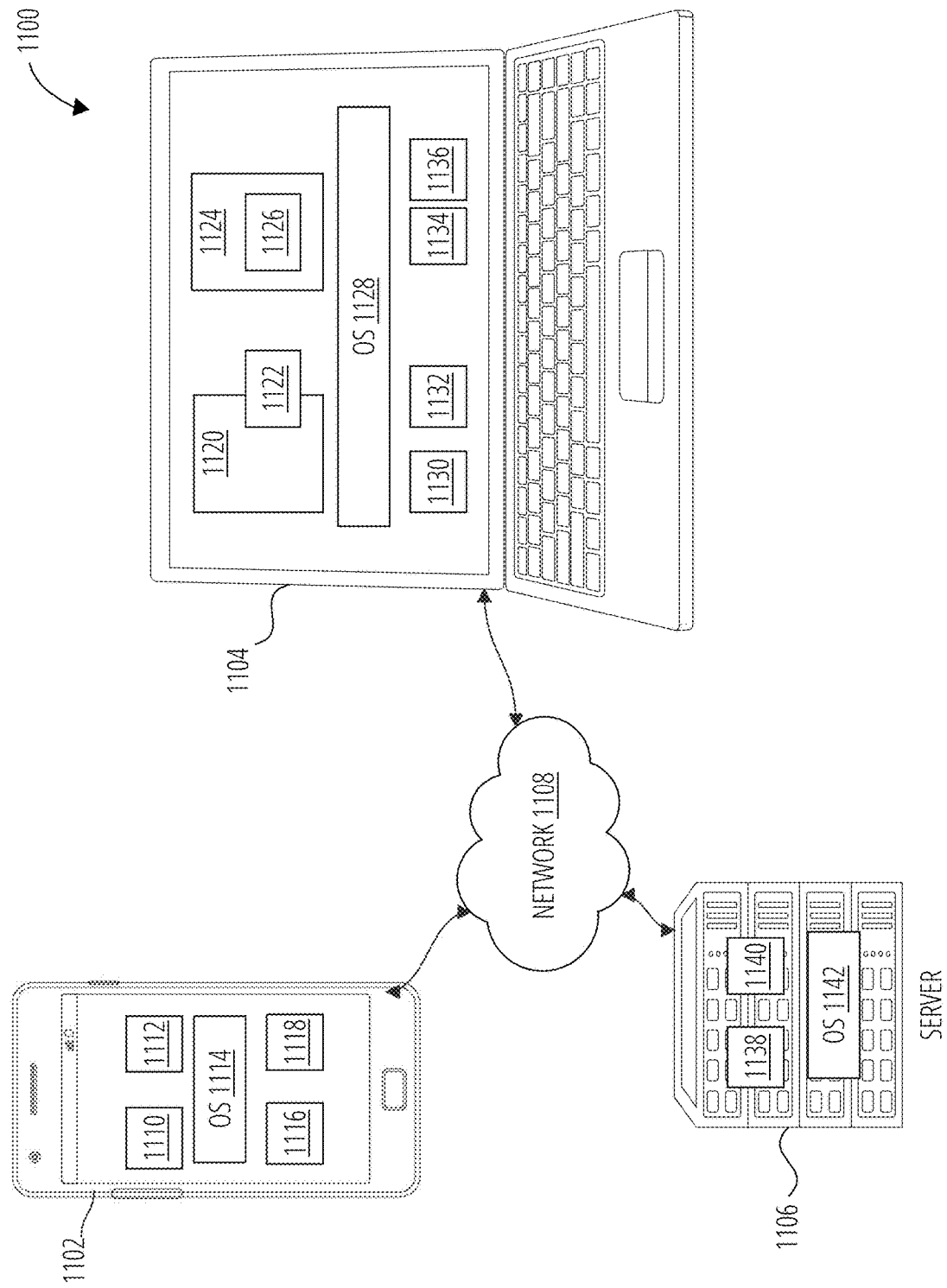
FIG. 11 illustrates a client server network configuration 1100 in accordance with one embodiment.

Referring to FIG. 11, a client server network configuration 1100 illustrates various computer hardware devices and software modules coupled by a network 1108 in one embodiment. "Software" refers to logic implemented as instructions to a programmable device or component of a device (e.g., a programmable processor, controller). Software can be source code, object code, executable code, machine language code. Unless otherwise indicated by context, software shall be understood to mean the embodiment of said code in a machine memory or hardware component, including "firmware" and micro-code. Each device includes a native operating system, typically pre-installed on its non-volatile RAM, and a variety of software applications or apps for performing various functions. "App" refers to a type of application with limited functionality, most commonly associated with applications executed on mobile devices. Apps tend to have a more limited feature set and simpler user interface than applications as those terms are commonly understood in the art. "Operating system" refers to logic, typically software, that supports a device's basic functions, such as scheduling tasks, managing files, executing applications, and interacting with peripheral devices. In normal parlance, an application is said to execute "above" the operating system, meaning that the operating system is necessary in order to load and execute the application and the application relies on modules of the operating system in most cases, not vice-versa. The operating system also typically intermediates between applications and drivers. Drivers are said to execute "below" the operating system because they intermediate between the operating system and hardware components or peripheral devices. "Application" refers to any software that is executed on a device above a level of the operating system. An application will typically be loaded by the operating system for execution and will make function calls to the operating system for lower-level services. An application often has a user interface but this is not always the case. Therefore, the term 'application' includes background processes that execute at a higher level than the operating system.

The mobile programmable device 1102 comprises a native operating system 1114 and various apps (e.g., app 1110 and app 1112). A computer 1104 also includes an operating system 1128 that may include one or more libraries of native routines to run executable software on that device. The computer 1104 also includes various executable applications (e.g., application 1120 and application 1124). "Executable" refers to a file comprising executable code. If the executable code is not interpreted computer code, a loader is typically used to load the executable for execution by a programmable device. "Library" refers to a collection of modules organized such that the functionality of all the modules may be included for use by software using references to the library in source code. The mobile programmable device 1102 and computer 1104 are configured as clients on the network 1108. A server 1106 is also provided and includes an operating system 1142 with native routines specific to providing a service (e.g., service 1140 and service 1138) available to the networked clients in this configuration. "Service" refers to a process configurable with one or more associated policies for use of the process. Services are commonly invoked on server devices by client devices, usually over a machine communication network such as the Internet. Many instances of a service may execute as different processes, each configured with a different or the same policies, each for a different client.

As is well known in the art, an application, an app, or a service may be created by first writing computer code to form a computer program, which typically comprises one or more computer code sections or modules. "Module" refers to logic organized in such a way as to comprise defined entry and exit points at its interface, for activation of functionality of the module by logic external to the module. "Computer code section" refers to one or more instructions. "Computer code" refers to any of source code, object code, or executable code. Computer code may comprise instructions in many forms, including source code, assembly code, object code, executable code, and machine language. "Machine language" refers to instructions in a form that is directly executable by a programmable device without further translation by a compiler, interpreter, or assembler. In digital devices, machine language instructions are typically sequences of ones and zeros. "Executable code" refers to instructions in a ready-to-execute form by a programmable device. For example, source code instructions in non-interpreted execution environments are not executable code because they must usually first undergo compilation, linking, and loading by the operating system before they have the proper form for execution. Interpreted computer code may be considered executable code because it can be directly applied to a programmable device (an interpreter) for execution, even though the interpreter itself may further transform the interpreted computer code into machine language instructions. "Object code" refers to the computer code output by a compiler or as an intermediate output of an interpreter. Object code often takes the form of machine language or an intermediate language such as register transfer language (RTL). "Assembly code" refers to a low-level source code language comprising a strong correspondence between the source code statements and machine language instructions. Assembly code is converted into executable code by an assembler. The conversion process is referred to as assembly. Assembly language usually has one statement per machine language instruction, but comments and statements that are assembler directives, macros, and symbolic labels may also be supported. "Source code" refers to a high-level textual computer language that requires either interpretation or compilation in order to be executed by a device. Computer programs often implement mathematical functions or algorithms and may implement or utilize one or more application program interfaces. "Application program interface" refers to instructions implementing entry points and return values to a module. "Algorithm" refers to any set of instructions configured to cause a machine to carry out a particular function or process.

A compiler is typically used to transform source code into object code and thereafter a linker combines object code files into an executable application, recognized by those skilled in the art as an "executable". "Linker" refers to logic that inputs one or more object code files generated by a compiler or an assembler and combines them into a single executable, library, or other unified object code output. One implementation of a linker directs its output directly to machine memory as executable code (performing the function of a loader as well). "Compiler" refers to logic that transforms source code from a high-level programming language into object code or in some cases, into executable code. The distinct file comprising the executable would then be available for use by the computer 1104, mobile programmable device 1102, and/or server 1106. "File" refers to a unitary package for storing, retrieving, and communicating data and/or instructions. A file is distinguished from other types of packaging by having associated management metadata utilized by the operating system to identify, characterize, and access the file. Any of these devices may employ a loader to place the executable and any associated library in memory for execution. "Loader" refers to logic for loading programs and libraries. The loader is typically implemented by the operating system. A typical loader copies an executable into memory and prepares it for execution by performing certain transformations, such as on memory addresses. The operating system executes the program by passing control to the loaded program code, creating a task or process. "Process" refers to software that is in the process of being executed on a device. "Task" refers to one or more operations that a process performs. An alternate means of executing an application or app involves the use of an interpreter 1126.

In addition to executing applications ("apps") and services, the operating system is also typically employed to execute drivers to perform common tasks such as connecting to third-party hardware devices (e.g., printers, displays, input devices), storing data, interpreting commands, and extending the capabilities of applications. "Driver" refers to low-level logic, typically software, that controls components of a device. Drivers often control the interface between an operating system or application and input/output components or peripherals of a device, for example. For example, a driver 1116 or driver 1118 on the mobile programmable device 1102 or computer 1104 (e.g., driver 1130 and driver 1132) might enable wireless headphones to be used for audio output(s) and a camera to be used for video inputs. Any of the devices may read and write data from and to files (e.g., file 1134 or file 1136) and applications or apps may utilize one or more plug-ins (e.g., plug-in 1122) to extend their capabilities (e.g., to encode or decode video files). "Plug-in" refers to software that adds features to an existing computer program without rebuilding (e.g., changing or re-compiling) the computer program. Plug-ins are commonly used for example with Internet browser applications.

The network 1108 in the client server network configuration 1100 can be of a type understood by those skilled in the art, including a Local Area Network (LAN), Wide Area Network (WAN), Transmission Communication Protocol/Internet Protocol (TCP/IP) network, and so forth. These protocols used by the network 1108 dictate the mechanisms by which data is exchanged between devices.

Machine Embodiments

Figure 12:
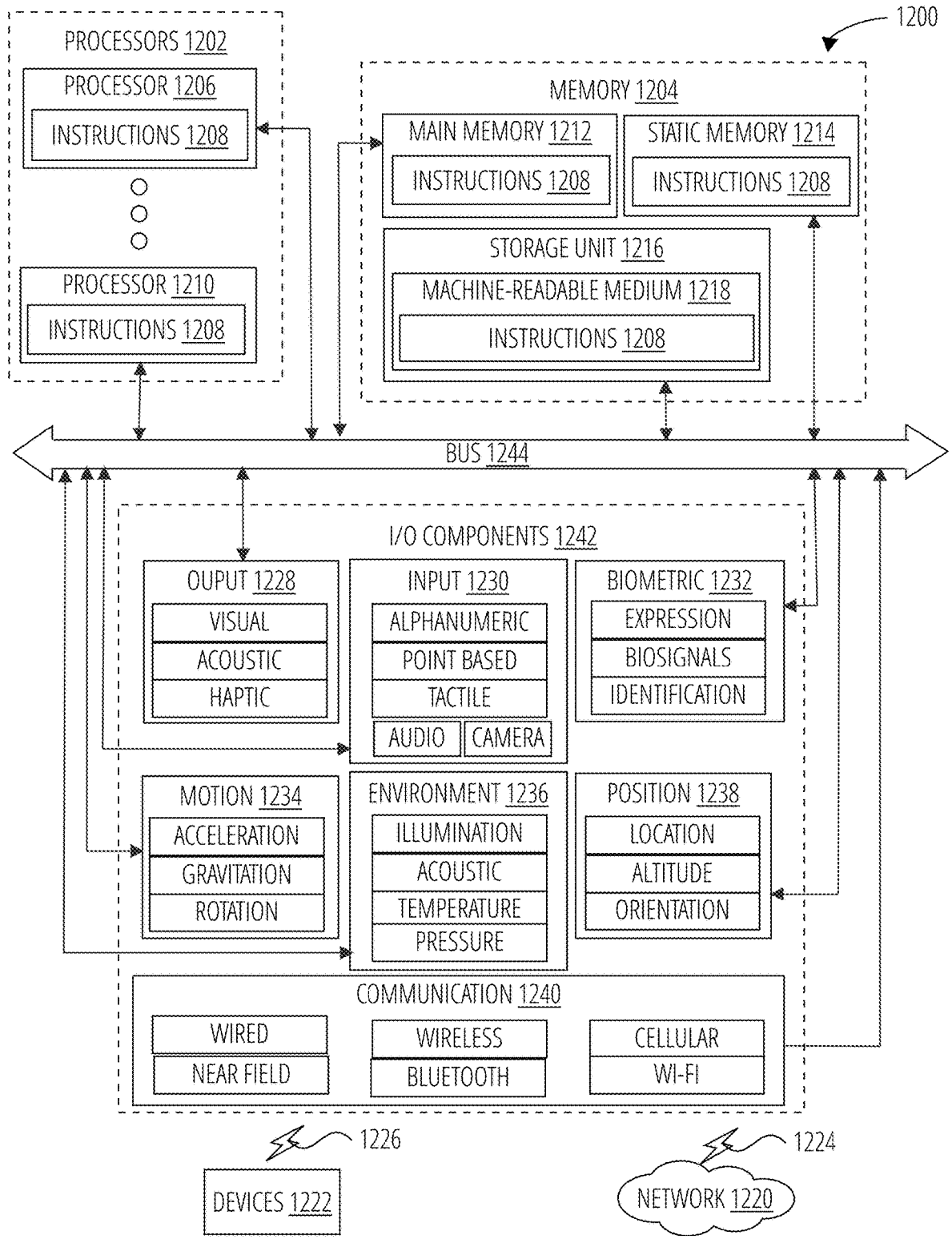
FIG. 12 depicts a machine 1200 in the form of a computer system within which a set of instructions may be executed for causing the machine to perform any one or more of the methodologies discussed herein, according to an example embodiment.

FIG. 12 depicts a diagrammatic representation of a machine 1200 in the form of a computer system within which logic may be implemented to cause the machine to perform any one or more of the functions or methods disclosed herein, according to an example embodiment.

Specifically, FIG. 12 depicts a machine 1200 comprising instructions 1208 (e.g., a program, an application, an applet, an app, or other executable code) for causing the machine 1200 to perform any one or more of the functions or methods discussed herein. For example the instructions 1208 may cause the machine 1200 to implement one or more modules of the interactive analytical system 100, transformational module interfaces 200, and convolutional neural network architecture 700, or the blocks of the communication training process 300. The instructions 1208 configure a general, non-programmed machine into a particular machine 1200 programmed to carry out said functions and/or methods.

In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is depicted, the term "machine" shall also be taken to include a collection of machines 200 that individually or jointly execute the instructions 1208 to perform any one or more of the methodologies or subsets thereof discussed herein.

The machine 1200 may include processors 1202, memory 1204, and I/O components 1242, which may be configured to communicate with each other such as via at least one bus 1244. In an example embodiment, the processors 1202 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an application-specific integrated circuit (ASIC), a Radio-Frequency Integrated Circuit (RFIC), another processor, or any suitable combination thereof) may include, for example, one or more processor (e.g., processor 1206 and processor 1210) to execute the instructions 1208. The term "processor" is intended to include multi-core processors that may comprise two or more independent processors (sometimes referred to as "cores") that may execute instructions contemporaneously. Although FIG. 12 depicts multiple processors 1202, the machine 1200 may include a single processor with a single core, a single processor with multiple cores (e.g., a multi-core processor), multiple processors with a single core, multiple processors with multiples cores, or any combination thereof.

The memory 1204 may include one or more of a main memory 1212, a static memory 1214, and a storage unit 1216, each accessible to the processors 1202 such as via the bus 1244. The main memory 1212, the static memory 1214, and storage unit 1216 may be utilized, individually or in combination, to store the instructions 1208 embodying any one or more of the functionalities described herein. The instructions 1208 may reside, completely or partially, within the main memory 1212, within the static memory 1214, within a machine-readable medium 1218 within the storage unit 1216, within at least one of the processors 1202 (e.g., within the processor's cache memory), or any suitable combination thereof, during execution thereof by the machine 1200.

The I/O components 1242 may include a wide variety of components to receive input, provide output, produce output, transmit information, exchange information, capture measurements, and so on. The specific I/O components 1242 that are included in a particular machine will depend on the type of machine. For example, portable machines such as mobile phones will likely include a touch input device or other such input mechanisms, while a headless server machine will likely not include such a touch input device. It will be appreciated that the I/O components 1242 may include many other components that are not shown in FIG. 12. The I/O components 1242 are grouped according to functionality merely for simplifying the following discussion and the grouping is in no way limiting. In various example embodiments, the I/O components 1242 may include output components 1228 and input components 1230. The output components 1228 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1230 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, and the like.

In further example embodiments, the I/O components 1242 may include biometric components 1232, motion components 1234, environmental components 1236, or position components 1238, among a wide array of possibilities. For example, the biometric components 1232 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1234 may include acceleration sensor components (e.g., accelerometer), gravitation sensor components, rotation sensor components (e.g., gyroscope), and so forth. The environmental components 1236 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1242 may include communication components 1240 operable to couple the machine 1200 to a network 1220 or devices 1222 via a coupling 1224 and a coupling 1226, respectively. For example, the communication components 1240 may include a network interface component or another suitable device to interface with the network 1220. In further examples, the communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1222 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as location via Internet Protocol (IP) geolocation, location via Wi-Fi® signal triangulation, location via detecting an NFC beacon signal that may indicate a particular location, and so forth.

Instruction and Data Storage Medium Embodiments

The various memories (i.e., memory 1204, main memory 1212, static memory 1214, and/or memory of the processors 1202) and/or storage unit 1216 may store one or more sets of instructions and data structures (e.g., software) embodying or utilized by any one or more of the methodologies or functions described herein. These instructions (e.g., the instructions 1208), when executed by processors 1202, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors and internal or external to computer systems. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

Communication Network Embodiments

In various example embodiments, one or more portions of the network 1220 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1220 or a portion of the network 1220 may include a wireless or cellular network, and the coupling 1224 may be a Code Division Multiple Access (CDMA) connection, a Global System for Mobile communications (GSM) connection, or another type of cellular or wireless coupling. In this example, the coupling 1224 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1208 and/or data generated by or received and processed by the instructions 1208 may be transmitted or received over the network 1220 using a transmission medium via a network interface device (e.g., a network interface component included in the communication components 1240) and utilizing any one of a number of well-known transfer protocols (e.g., hypertext transfer protocol (HTTP)). Similarly, the instructions 1208 may be transmitted or received using a transmission medium via the coupling 1226 (e.g., a peer-to-peer coupling) to the devices 1222. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1208 for execution by the machine 1200, and/or data generated by execution of the instructions 1208, and/or data to be operated on during execution of the instructions 1208, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S. § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A system comprising:
a video analyzer to convert a video signal into a plurality of human morphology features;
an audio analyzer to convert an audio signal into a plurality of human speech features;
a transformation module to transform the human morphology features and the human speech features into performance metrics for passion, content, and engagement in a current multi-feature performance vector;
combinatorial logic to generate an integration of the current multi-feature performance vector and one or more prior multi-feature performance vectors to generate a multi-session rubric;
a plurality of behavioral models each configurable as a scoring control on the combinatorial logic such that scores generated for the integration in the multi-session rubric by the combinatorial logic vary according to the behavioral model configured as a scoring control for the combinatorial logic;
wherein the combinatorial logic comprises a supervised and unsupervised machine learning system;
the multi-session rubric applied to generate visual and auditory behavioral change recommendations for a human operator; and
backpropagation logic to apply the current multi-feature performance vector from the combinatorial logic to the video analyzer and the audio analyzer.

2. The system of claim 1, wherein the video analyzer comprises one or more models embodied in a neural network.

3. The system of claim 2, wherein the neural network comprises at least one convolutional neural network.

4. The system of claim 2, wherein the neural network comprises at least one convolutional neural network coupled to at least one recurrent neural network.

5. The system of claim 1, further comprising a speech-to-text converter.

6. The system of claim 5, further comprising a natural language processor coupled to receive text from the speech-to-text converter.

7. The system of claim 1, the audio analyzer comprising a canny edge detector and a Fast Fourier Transform.

8. The system of claim 1, wherein the multi-session rubric comprises scores for a plurality of second-level performance features grouped within top-level categories for passion, content, and engagement.

9. A method comprising:
converting a video signal into a plurality of human morphology features with a video analyzer;
converting an audio signal into a plurality of human speech features with an audio analyzer;
utilizing supervised and unsupervised machine learning models to transform the human morphology features and the human speech features into performance metrics for passion, content, and engagement in a current multi-feature performance vector;
generating an integration, by combinatorial logic, of the current multi-feature performance vector and one or more prior multi-feature performance vectors;
configuring one of a plurality of behavioral models as a scoring control on the combinatorial logic such that scores generated for the integration in a multi-session rubric by the combinatorial logic vary according to the behavioral features against model configured as a scoring control for combinatorial logic;
wherein the multi-session rubric comprises a plurality of second-level performance scores grouped within top-level categories of passion, content, and engagement;
applying the multi-session rubric to generate visual and auditory behavioral change recommendations for a human operator; and
applying the current multi-feature performance vector as an adaptive feedback signal to the video analyzer and the audio analyzer.

10. The method of claim 9, wherein the video analyzer comprises one or more models embodied in a neural network.

11. The method of claim 10, wherein the neural network comprises at least one convolutional neural network.

12. The method of claim 10, wherein the neural network comprises at least one convolutional neural network coupled to at least one recurrent neural network.

13. The method of claim 9, wherein transforming the human speech features is performed with a speech-to-text converter.

14. The method of claim 13, further comprising the use of a natural language processor coupled to receive text from the speech-to-text converter.

15. The method of claim 9, wherein the audio analyzer comprises a canny edge detector and a Fast Fourier Transform.

16. A non-transitory computer-readable storage medium, the computer-readable storage medium including instructions that when executed by a processor, cause a machine comprising the processor to:
convert a video signal into a plurality of human morphology features with a video analyzer;
convert an audio signal into a plurality of human speech features with an audio analyzer;
utilize supervised and unsupervised machine learning models to transform the human morphology features and the human speech features into performance metrics for passion, content, and engagement in a current multi-feature performance vector;
generate an integration, by combinatorial logic, of the current multi-feature performance vector and one or more prior multi-feature performance vectors;

configure one of a plurality of behavioral models as a scoring control on the combinatorial logic such that scores generated for the integration in a multi-session rubric by the combinatorial logic vary according to the behavioral model configured as a scoring control for combinatorial logic;

wherein the multi-session rubric comprises a plurality of second-level performance scores grouped within top-level categories of passion, content, and engagement;

apply the multi-session rubric to generate visual and auditory behavioral change recommendations for a human operator; and apply the current multi-feature performance vector as an adaptive feedback signal to the video analyzer and the audio analyzer.

17. The non-transitory computer-readable storage medium of claim 16, the computer-readable storage medium further including instructions that when executed by the processor, cause the machine comprising the processor to:

convert the video signal into the plurality of human morphology features using the video analyzer, wherein the video analyzer comprises one or more models embodied in a neural network;

transform the human speech features using a speech-to-text converter; and convert the audio signal into the plurality of human speech features using the audio analyzer, wherein the audio analyzer comprises a canny edge detector and a Fast Fourier Transform.

18. The non-transitory computer-readable storage medium of claim 17, wherein:

the neural network comprises at least one convolutional neural network; and the neural network comprises the at least one convolutional neural network coupled to at least one recurrent neural network.

* * * * *